United States Patent
Tseng et al.

(10) Patent No.: US 10,153,690 B1
(45) Date of Patent: Dec. 11, 2018

(54) BRIDGELESS INTERLEAVED POWER FACTOR CORRECTOR AND METHOD OF CONTROLLING THE SAME

(71) Applicant: Chicony Power Technology Co., Ltd., New Taipei (TW)

(72) Inventors: Sheng-Yu Tseng, New Taipei (TW); Ting-Chun Chien, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/008,605

(22) Filed: Jun. 14, 2018

(30) Foreign Application Priority Data

Mar. 21, 2018 (TW) .............................. 107109727 A

(51) Int. Cl.
*H02M 1/42* (2007.01)
*H02M 7/12* (2006.01)
*H02M 7/06* (2006.01)

(52) U.S. Cl.
CPC ........... *H02M 1/4225* (2013.01); *H02M 7/06* (2013.01)

(58) Field of Classification Search
CPC .... H02M 1/42; H02M 1/4225; H02M 1/4233; H02M 1/4266; H02M 7/02; H02M 7/04; H02M 7/12; H02M 7/21; H02M 7/217; H02M 7/219
See application file for complete search history.

(56) References Cited

U.S. PATENT DOCUMENTS

| | | | | |
|---|---|---|---|---|
| 8,385,032 B1* | 2/2013 | Mao | .................... | H02M 1/4225 361/111 |
| 8,467,212 B2* | 6/2013 | Mino | .................. | H02M 1/4208 363/126 |
| 2011/0149622 A1* | 6/2011 | Lin | ..................... | H02M 1/4208 363/124 |
| 2011/0316465 A1* | 12/2011 | Bouchez | .................. | H02J 7/02 318/400.42 |
| 2014/0268952 A1* | 9/2014 | Tong | ................... | H02M 1/4241 363/89 |
| 2014/0354246 A1 | 12/2014 | Xu et al. | | |
| 2014/0354247 A1 | 12/2014 | Xu et al. | | |
| 2018/0115256 A1* | 4/2018 | Ho | ........................ | H02M 7/217 |

FOREIGN PATENT DOCUMENTS

CN          202652056 U     1/2013

* cited by examiner

*Primary Examiner* — Gary L Laxton
(74) *Attorney, Agent, or Firm* — Muncy, Geissler, Olds & Lowe, P.C.

(57) ABSTRACT

A bridgeless interleaved power factor corrector is used to convert an AC power source into a DC power source. The bridgeless interleaved power factor corrector includes a first conversion circuit, a second conversion circuit, a first power switch, a second power switch, a positive-half control switch, and a negative-half control switch. The first power switch is coupled to one of two positive-half operation units of the first conversion circuit and one of two negative-half operation units of the second conversion circuit. The second power switch is coupled to the other one of two positive-half operation units and the other one of two negative-half operation units. The positive-half control switch is coupled between a neutral end and a ground end, and the negative-half control switch is coupled between a line end and the ground end.

20 Claims, 17 Drawing Sheets

BRIDGELESS INTERLEAVED POWER FACTOR CORRECTOR AND METHOD OF CONTROLLING THE SAME

BACKGROUND OF THE INVENTION

Field of the Invention

The present invention relates to a power factor corrector and method for controlling the same, especially to a bridgeless interleaved power factor corrector and method for controlling the same.

Description of Related Art

FIG. 1 is a circuit diagram of a related art bridgeless interleaved power factor corrector (PFC). Generally, in comparison with conventional PFC with bridge rectifier, the bridgeless interleaved PFC improves efficiency by reducing conduction loss of power diode.

In the bridgeless interleaved PFC of FIG. 1, the first energy-storage inductor L1 is coupled to the line end L of the AC mains and the second energy-storage inductor L2 is coupled to the neutral end N of the AC mains. The first semiconductor switch S1 is coupled to the first energy-storage inductor L1 and the second semiconductor switch S2 is coupled to the second energy-storage inductor L2. The anode of the first boost diode D1 is coupled to the first energy-storage inductor L1 and is in serial connection with the first semiconductor switch S1. The anode of the second boost diode D2 is coupled to the second energy-storage inductor L2 and is in serial connection with the second semiconductor switch S2. The cathode of the first boost diode D1 is coupled to the cathode of the second boost diode D2 and then coupled to the positive voltage side of the output capacitance Co. The first semiconductor switch S1 is coupled to the second semiconductor switch S2 and then coupled to the negative voltage side of the output capacitance Co.

In positive cycle of the AC mains, when both the first semiconductor switch S1 and the second semiconductor switch S2 are turned on, the loop current flows to the first energy-storage inductor L1 and the second energy-storage inductor L2 and then charges the first energy-storage inductor L1 and the second energy-storage inductor L2.

In positive cycle of the AC mains, when both the first semiconductor switch S1 and the second semiconductor switch S2 are turned off, the loop current flows to the output capacitance Co through the first boost diode D1 and charges the output capacitance Co. At this time, the first energy-storage inductor L1 and the second energy-storage inductor L2 also discharge to the output capacitance Co.

In negative cycle of the AC mains, when both the first semiconductor switch S1 and the second semiconductor switch S2 are turned on, the loop current flows to the first energy-storage inductor L1 and the second energy-storage inductor L2 and then charges the first energy-storage inductor L1 and the second energy-storage inductor L2.

In negative cycle of the AC mains, when both the first semiconductor switch S1 and the second semiconductor switch S2 are turned off, the loop current flows to the output capacitance Co through the second boost diode D2 and charges the output capacitance Co. At this time, the first energy-storage inductor L1 and the second energy-storage inductor L2 also discharge to the output capacitance Co.

However, in the related art PFC, the output voltage is floating in the switching period between the turning on and off of the first semiconductor switch S1 and the second semiconductor switch S2, namely floating with respect to the AC mains and ground end GND. Moreover, during the discharging of the first energy-storage inductor L1 and the second energy-storage inductor L2, the semiconductor switch not conducting current has parasitic capacitance; the resulting EMI will influence the circuit performance.

SUMMARY OF THE INVENTION

It is an object of the present invention to provide a bridgeless interleaved power factor corrector, by which the voltage floating and the resulting EMI of the bridgeless interleaved power factor corrector during switching can be prevented.

Accordingly, the present invention provides a bridgeless interleaved power factor corrector (PFC) adapted to convert an AC power source into a DC power source, the bridgeless interleaved PFC comprising: a first conversion circuit coupled to a line end of the AC power source and comprising two positive-half operation units, the two positive-half operation units coupled to a positive voltage end with respect to a ground end; a second conversion circuit coupled to a neutral end of the AC power source and in parallel connection with the first conversion circuit, the second conversion circuit comprising two negative-half operation units coupled to the positive voltage end; a first power switch coupled to one of the two positive-half operation units and one of the two negative-half operation units and between the coupled operation units and the ground end; a second power switch coupled to the other one of the two positive-half operation units and the other one of the two negative-half operation units and between the coupled operation units and the ground end; a positive-half control switch coupled between the neutral end and the ground end; and a negative-half control switch coupled between the line end and the ground end.

According to one of the embodiments, the bridgeless interleaved PFC further comprises an output capacitance coupled between the positive voltage end and the ground end, and providing the DC power source.

According to one of the embodiments, the two positive-half operation units comprise a first positive-half operation unit and a second positive-half operation unit. The first positive-half operation unit comprises a first diode; a second diode coupled to the first diode to form a first parallel branch, the first parallel branch coupled to the positive voltage end and the first power switch; and a first inductor in serial connection with the first parallel branch. The second positive-half operation unit comprises a third diode; a fourth diode coupled to the third diode to form a second parallel branch, the second parallel branch coupled to the positive voltage end and the second power switch; and a second inductor in serial connection with the second parallel branch. The two negative-half operation units comprise a first negative-half operation unit and a second negative-half operation unit. The first negative-half operation unit comprises a fifth diode; a sixth diode coupled to the fifth diode to form a third parallel branch, the third parallel branch coupled to the positive voltage end and the first power switch; and a third inductor in serial connection with the third parallel branch. The second negative-half operation unit comprises a seventh diode; an eighth diode coupled to the seventh diode to form a fourth parallel branch, the fourth parallel branch coupled to the positive voltage end and the second power switch; and a fourth inductor in serial connection with the fourth parallel branch.

According to one of the embodiments, in the bridgeless interleaved PFC, a cathode of the second diode, a cathode of the fourth diode, a cathode of the sixth diode, a cathode of the eighth diode are coupled to the positive voltage end; a cathode of the first diode and a cathode of the fifth diode are coupled to a non-ground end of the first power switch; a cathode of the third diode and a cathode of the seventh diode are coupled to a non-ground end of the second power switch.

According to one of the embodiments, when the AC power source is in positive-half operation, the positive-half control switch is turned on, the negative-half control switch is turned off, the first power switch and the second power switch are switched between turning on and turning off; when the AC power source is in negative-half operation, the positive-half control switch is turned off, the negative-half control switch is turned on, the first power switch and the second power switch are switched between turning on and turning off.

According to one of the embodiments, when the positive-half control switch is turned on and the first power switch is turned on, the first diode is turned on and the first inductor is in energy-storage operation; when the positive-half control switch is turned on and the second power switch is turned on, the third diode is turned on and the second inductor is in energy-storage operation; when the negative-half control switch is turned on and the first power switch is turned on, the fifth diode is turned on and the third inductor is in energy-storage operation; and when the negative-half control switch is turned on and the second power switch is turned on, the seventh diode is turned on and the fourth inductor is in energy-storage operation.

According to one of the embodiments, when the positive-half control switch is turned on and the first power switch is turned off, the second diode is turned on and the first inductor is in energy-release operation; when the positive-half control switch is turned on and the second power switch is turned off, the fourth diode is turned on and the second inductor is in energy-release operation; when the negative-half control switch is turned on and the first power switch is turned off, the sixth diode is turned on and the third inductor is in energy-release operation; and when the negative-half control switch is turned on and the second power switch is turned off, the eighth diode is turned on and the fourth inductor is in energy-release operation.

According to one of the embodiments, when the first inductor is in energy-storage operation, the line end, the first inductor, the first diode, the first power switch, the ground end, the positive-half control switch and the neutral end form a first energy-storage path; when the second inductor is in energy-storage operation, the line end, the second inductor, the third diode, the second power switch, the ground end, the positive-half control switch and the neutral end form a second energy-storage path; when the third inductor is in energy-storage operation, the neutral end, the third inductor, the fifth diode, the first power switch, the ground end, the negative-half control switch and the line end form a third energy-storage path; and when the fourth inductor is in energy-storage operation, the neutral end, the fourth inductor, the seventh diode, the second power switch, the ground end, the negative-half control switch and the line end form a fourth energy-storage path.

According to one of the embodiments, when the first inductor is in energy-release operation, the first inductor, the second diode, the output capacitance, the ground end, the positive-half control switch, the neutral end, and the line end form a first energy-release path; when the second inductor is in energy-release operation, the second inductor, the fourth diode, the output capacitance, the ground end, the positive-half control switch, the neutral end, and the line end form a second energy-release path; when the third inductor is in energy-release operation, the third inductor, the sixth diode, the output capacitance, the ground end, the negative-half control switch, the line end, and the neutral end form a third energy-release path; and when the fourth inductor is in energy-release operation, the fourth inductor, the eighth diode, the output capacitance, the ground end, the negative-half control switch, the line end, and the neutral end form a fourth energy-release path.

According to one of the embodiments, the first power switch and the second power switch are interleaved between turning on and off with 0-180 degree phase difference.

It is another object of the present invention to provide a method for controlling bridgeless interleaved power factor corrector, by which the voltage floating and the resulting EMI of the bridgeless interleaved power factor corrector during switching can be prevented.

Accordingly, the present invention provides a method for controlling a bridgeless interleaved PFC, the bridgeless interleaved PFC converting an AC power source into a DC power source and the bridgeless interleaved PFC comprising a first conversion circuit coupled to a line end of the AC power source, a second conversion circuit coupled to a neutral end of the AC power source, a first power switch and a second power switch coupled between the first conversion circuit, the second conversion circuit and the ground end, a positive-half control switch coupled between the neutral end and the ground end and a negative-half control switch coupled between the line end and the ground end. The method comprises: (a) when the AC power source is in positive-half operation, turning on the positive-half control switch and turning off the negative-half control switch; (b) turning on the first power switch to render a first inductor in the first conversion circuit to conduct energy-storage operation; turning on the second power switch to render a second inductor in the first conversion circuit to conduct energy-storage operation; (c) when the AC power source is in negative-half operation, turning off the positive-half control switch and turning on the negative-half control switch; and (d) turning on the first power switch to render a third inductor in the second conversion circuit to conduct energy-storage operation; turning on the second power switch to render a fourth inductor in the second conversion circuit to conduct energy-storage operation.

According to one of the embodiments, the step (b) further comprises: (b') turning off the first power switch to render the first inductor to conduct energy-release operation; turning off the second power switch to render the second inductor to conduct energy-release operation. The step (d) further comprises: (d') turning off the first power switch to render the third inductor to conduct energy-release operation; turning off the second power switch to render the fourth inductor to conduct energy-release operation.

According to one of the embodiments, the method further comprises: providing two positive-half operation units in the first conversion circuit and coupling the two positive-half operation units to a positive voltage end with respect to the ground end; providing two negative-half operation units in the second conversion circuit and coupling the two negative-half operation units to the positive voltage end; coupling the first power switch to one of the two positive-half operation units and one of the two negative-half operation units and between the coupled operation units and the ground end; and coupling the second power switch to the other one of the two positive-half operation units and the other one of the two negative-half operation units and between the coupled operation units and the ground end.

According to one of the embodiments, the method further comprises: providing an output capacitance coupled between the positive voltage end and the ground end and the output capacitance providing the DC power source.

According to one of the embodiments, the two positive-half operation units comprise a first positive-half operation unit and a second positive-half operation unit. The first positive-half operation unit comprises: a first diode; a second diode coupled to the first diode to form a first parallel branch, the first parallel branch coupled to the positive voltage end and the first power switch; and a first inductor in serial connection with the first parallel branch. The second positive-half operation unit comprising: a third diode; a fourth diode coupled to the third diode to form a second parallel branch, the second parallel branch coupled to the positive voltage end and the second power switch; and a second inductor in serial connection with the second parallel branch. The two negative-half operation units comprise a first negative-half operation unit and a second negative-half operation unit. The first negative-half operation unit comprises: a fifth diode; a sixth diode coupled to the fifth diode to form a third parallel branch, the third parallel branch coupled to the positive voltage end and the first power switch; and a third inductor in serial connection with the third parallel branch. The second negative-half operation unit comprises a seventh diode; an eighth diode coupled to the seventh diode to form a fourth parallel branch, the fourth parallel branch coupled to the positive voltage end and the second power switch; and a fourth inductor in serial connection with the fourth parallel branch.

According to one of the embodiments, a cathode of the second diode, a cathode of the fourth diode, a cathode of the sixth diode, a cathode of the eighth diode are coupled to the positive voltage end; a cathode of the first diode and a cathode of the fifth diode are coupled to a non-ground end of the first power switch; a cathode of the third diode and a cathode of the seventh diode are coupled to a non-ground end of the second power switch.

According to one of the embodiments, when the AC power source is in positive-half operation, the positive-half control switch is turned on, the negative-half control switch is turned off, the first power switch and the second power switch are switched between turning on and turning off; when the AC power source is in negative-half operation, the positive-half control switch is turned off, the negative-half control switch is turned on, the first power switch and the second power switch are switched between turning on and turning off.

According to one of the embodiments, when the positive-half control switch is turned on and the first power switch is turned on, the first diode is turned on and the first inductor is in energy-storage operation; when the positive-half control switch is turned on and the second power switch is turned on, the third diode is turned on and the second inductor is in energy-storage operation; when the negative-half control switch is turned on and the first power switch is turned on, the fifth diode is turned on and the third inductor is in energy-storage operation; and when the negative-half control switch is turned on and the second power switch is turned on, the seventh diode is turned on and the fourth inductor is in energy-storage operation.

According to one of the embodiments, when the positive-half control switch is turned on and the first power switch is turned off, the second diode is turned on and the first inductor is in energy-release operation; when the positive-half control switch is turned on and the second power switch is turned off, the fourth diode is turned on and the second inductor is in energy-release operation; when the negative-half control switch is turned on and the first power switch is turned off, the sixth diode is turned on and the third inductor is in energy-release operation; when the negative-half control switch is turned on and the second power switch is turned off, the eighth diode is turned on and the fourth inductor is in energy-release operation.

According to one of the embodiments, when the first inductor is in energy-storage operation, the line end, the first inductor, the first diode, the first power switch, the ground end, the positive-half control switch and the neutral end form a first energy-storage path; when the second inductor is in energy-storage operation, the line end, the second inductor, the third diode, the second power switch, the ground end, the positive-half control switch and the neutral end form a second energy-storage path; when the third inductor is in energy-storage operation, the neutral end, the third inductor, the fifth diode, the first power switch, the ground end, the negative-half control switch and the line end form a third energy-storage path; when the fourth inductor is in energy-storage operation, the neutral end, the fourth inductor, the seventh diode, the second power switch, the ground end, the negative-half control switch and the line end form a fourth energy-storage path.

According to one of the embodiments, when the first inductor is in energy-release operation, the first inductor, the second diode, the output capacitance, the ground end, the positive-half control switch, the neutral end, and the line end form a first energy-release path; when the second inductor is in energy-release operation, the second inductor, the fourth diode, the output capacitance, the ground end, the positive-half control switch, the neutral end, and the line end form a second energy-release path; when the third inductor is in energy-release operation, the third inductor, the sixth diode, the output capacitance, the ground end, the negative-half control switch, the line end, and the neutral end form a third energy-release path; when the fourth inductor is in energy-release operation, the fourth inductor, the eighth diode, the output capacitance, the ground end, the negative-half control switch, the line end, and the neutral end form a fourth energy-release path.

According to one of the embodiments, the first power switch and the second power switch are interleaved between turning on and off with 0-180 degree phase difference.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

The detailed description of the present invention will be described in detail below with reference to the attached drawings.

Figure 1:
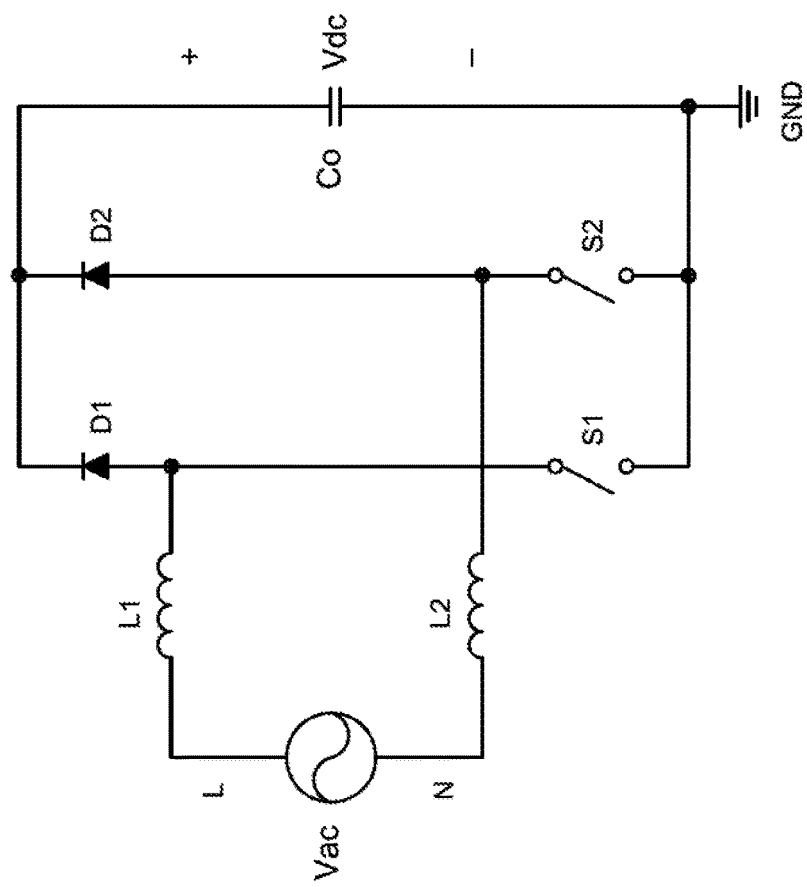
FIG. 1 is a circuit diagram of a related art bridgeless interleaved power factor corrector (PFC).
Figure 2:
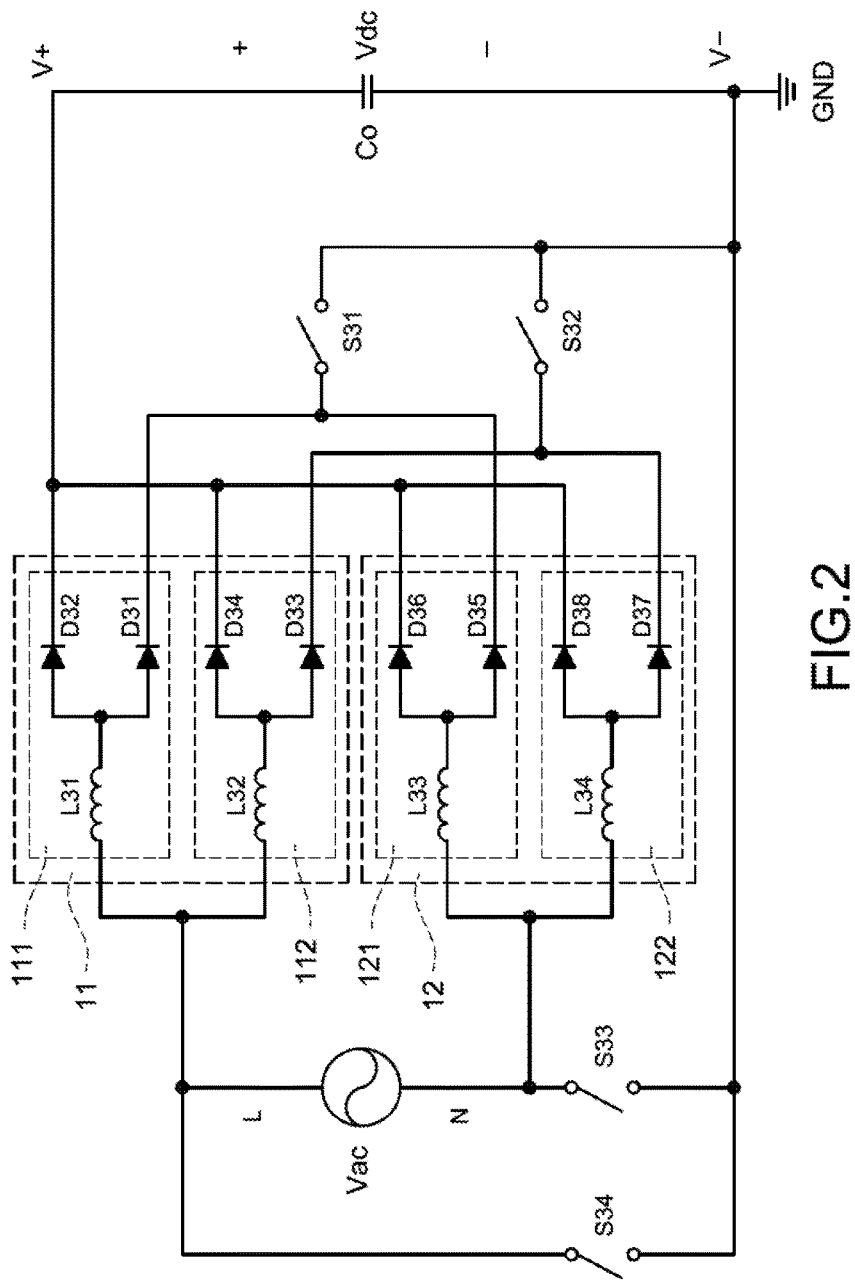
FIG. 2 is a circuit diagram of the bridgeless interleaved power factor corrector (PFC) according to the present invention.

FIG. 2 is a circuit diagram of the bridgeless interleaved power factor corrector (PFC) according to the present invention. The bridgeless interleaved PFC converts the AC power source Vac to the DC power source Vdc and comprises a first conversion circuit 11, a second conversion circuit 12, a first power switch S31, a second power switch S32, a positive-half control switch S33 and a negative-half control switch S34.

The first conversion circuit 11 is coupled to the line end L of the AC power source Vac. In this embodiment, the first conversion circuit 11 comprises two positive-half operation units, namely, the first positive-half operation unit 111 and the second positive-half operation unit 112. The first positive-half operation unit 111 and the second positive-half operation unit 112 are coupled to the positive voltage end V+, which is of positive voltage with respect to the ground end GND. The positive voltage end V+ is the positive voltage end of the DC power source Vdc. More particularly, the bridgeless interleaved PFC further comprises an output capacitance Co coupled between the positive voltage end V+ and the ground end GND, namely between the positive voltage end V+ and the negative voltage end V− to provide the DC power source Vdc.

The second conversion circuit 12 is coupled to the neutral end N of the AC power source Vac and is parallel connected to the first conversion circuit 11. The second conversion circuit 12 comprises two negative-half operation units, namely, the first negative-half operation unit 121 and the second negative-half operation unit 122. The first negative-half operation unit 121 and the second negative-half operation unit 122 are coupled to the positive voltage end V+.

The first power switch S31 is coupled to one of the first positive-half operation unit 111 and the second positive-half operation unit 112, one of the first negative-half operation unit 121 and the second negative-half operation unit 122, and between the coupled operation units (namely, the one of the positive-half operation units 111, 112 coupled to the first power switch S31 and the one of the negative-half operation units 121, 122 coupled to the first power switch S31) and the ground end GND. In this embodiment, the first power switch S31 is coupled between the first positive-half operation unit 111, the first negative-half operation unit 121 and the ground end GND.

The second power switch S32 is coupled to the other one of the first positive-half operation unit 111 and the second positive-half operation unit 112, the other one of the first negative-half operation unit 121 and the second negative-half operation unit 122, and between the coupled operation units (namely, the other one of the positive-half operation units 111, 112 coupled to the second power switch S32 and the other one of the negative-half operation units 121, 122 coupled to the second power switch S32) and the ground end GND. In this embodiment, the second power switch S32 is coupled between the second positive-half operation unit 112, the second negative-half operation unit 122 and the ground end GND.

The positive-half control switch S33 is coupled between the neutral end N and the ground end GND. The negative-half control switch S34 is coupled between the line end L and the ground end GND. When the AC power source Vac is in positive-half cycle, the positive-half control switch S33 is turned on to provide control for positive-half operation; when the AC power source Vac is in negative-half cycle, the negative-half control switch S34 is turned on to provide control for negative-half operation, which will be detailed later.

The first positive-half operation unit 111 comprises a first diode D31, a second diode D32 and a first inductor L31. The second diode D32 is coupled to the first diode D31 to form a first parallel branch, wherein the first parallel branch is coupled to the positive voltage end V+ and the first power switch S31. The first inductor L31 is in serial connection with the first parallel branch. The second positive-half operation unit 112 comprises a third diode D33, a fourth diode D34 and a second inductor L32. The fourth diode D34 is coupled to the third diode D33 to form a second parallel branch, wherein the second parallel branch is coupled to the positive voltage end V+ and the second power switch S32. The second inductor L32 is in serial connection with the second parallel branch.

The first negative-half operation unit 121 comprises a fifth diode D35, a sixth diode D36 and a third inductor L33. The sixth diode D36 is coupled to the fifth diode D35 to form the third parallel branch, wherein the third parallel branch is coupled to the positive voltage end V+ and the first power switch S31. The third inductor L33 is in serial connection with the third parallel branch. The second negative-half operation unit 122 comprises a seventh diode D37, an eighth diode D38 and a fourth inductor L34. The eighth diode D38 is coupled to the seventh diode D37 to form a fourth parallel branch, wherein the fourth parallel branch is coupled to the positive voltage end V+ and the second power switch S32. The fourth inductor L34 is in serial connection with the fourth parallel branch.

The cathode of the second diode D32, the cathode of the fourth diode D34, the cathode of the sixth diode D36, and the cathode of the eighth diode D38 are together coupled to the positive voltage end V+. The cathode of the first diode D31 and the cathode of the fifth diode D35 are coupled to the non-ground end of the first power switch S31. The cathode of the third diode D33 and the cathode of the seventh diode D37 are coupled to the non-ground end of the second power switch S32.

Hereinafter, the operations of the conversion circuits, the power switches and the control switches for the bridgeless interleaved PFC operating in positive-half and negative-half are described.

When the AC power source Vac is in positive-half cycle, the positive-half control switch S33 is turned on and the negative-half control switch S34 is turned off, while the first power switch S31 and the second power switch S32 switch between turning on and turning off. On the contrary, when the AC power source Vac is in negative-half cycle, the positive-half control switch S33 is turned off and the negative-half control switch S34 is turned on, while the first power switch S31 and the second power switch S32 switch between turning on and turning off. Namely, the turning-on of the positive-half control switch S33 and the negative-half control switch S34 are corresponding to the on time of the positive-half cycle and negative-half cycle of the AC power source Vac while the first power switch S31 and the second power switch S32 switch between turning on and turning off.

When the positive-half control switch S33 is turned on and the first power switch S31 is turned on, the first diode D31 is turned on and the first inductor L31 is in energy-storage operation. When the positive-half control switch S33 is turned on and the second power switch S32 is turned on, the third diode D33 is turned on and the second inductor L32 is in energy-storage operation. When the negative-half control switch S34 is turned on and the first power switch S31 is turned on, the fifth diode D35 is turned on and the third inductor L33 is in energy-storage operation. When the negative-half control switch S34 is turned on and the second power switch S32 is turned on, the seventh diode D37 is turned on and the fourth inductor L34 is in energy-storage operation.

When the positive-half control switch S33 is turned on and the first power switch S31 is turned off, the second diode D32 is turned on and the first inductor L31 is in energy-release operation. When the positive-half control switch S33 is turned on and the second power switch S32 is turned off, the fourth diode D34 is turned on and the second inductor L32 is in energy-release operation. When the negative-half control switch S34 is turned on and the first power switch S31 is turned off, the sixth diode D36 is turned on and the third inductor L33 is in energy-release operation. When the negative-half control switch S34 is turned on and the second power switch S32 is turned off, the eighth diode D38 is turned on and the fourth inductor L34 is in energy-release operation.

Figure 3:
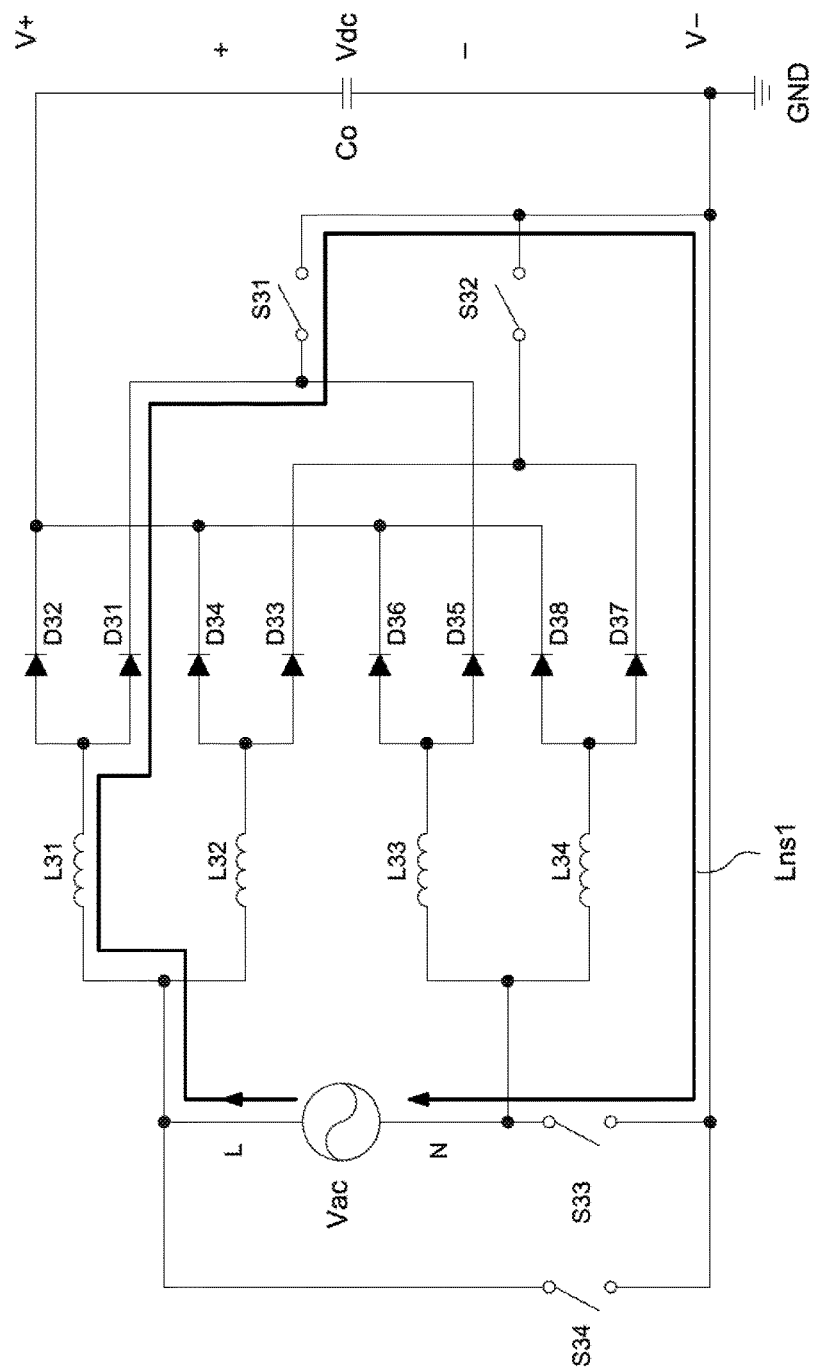
FIG. 3 is a schematic diagram showing the bridgeless interleaved PFC of the present invention, which is operated in a first energy-storage path with the first inductor.

FIG. 3 is a schematic diagram showing the bridgeless interleaved PFC of the present invention, which is operated in a first energy-storage path with the first inductor L31. When the AC power source Vac is in positive-half cycle (the positive-half control switch S33 is turned on) and the first inductor L31 is in energy-storage operation, the line end L, the first inductor L31, the first diode D31, the first power switch S31, the ground end GND, the positive-half control switch S33 and the neutral end N form a first energy-storage path Lns1. It should be noted that FIG. 3 is simplified and the switches passed by the first energy-storage path Lns1 should be turned on, namely, the positive-half control switch S33 and the first power switch S31 are in fact turned on (even though they are depicted as turned off in FIG. 3). Similarly, the switches along other energy-storage paths or energy-release paths in other drawings are also in fact turned on and additional description is omitted for brevity.

Figure 4:
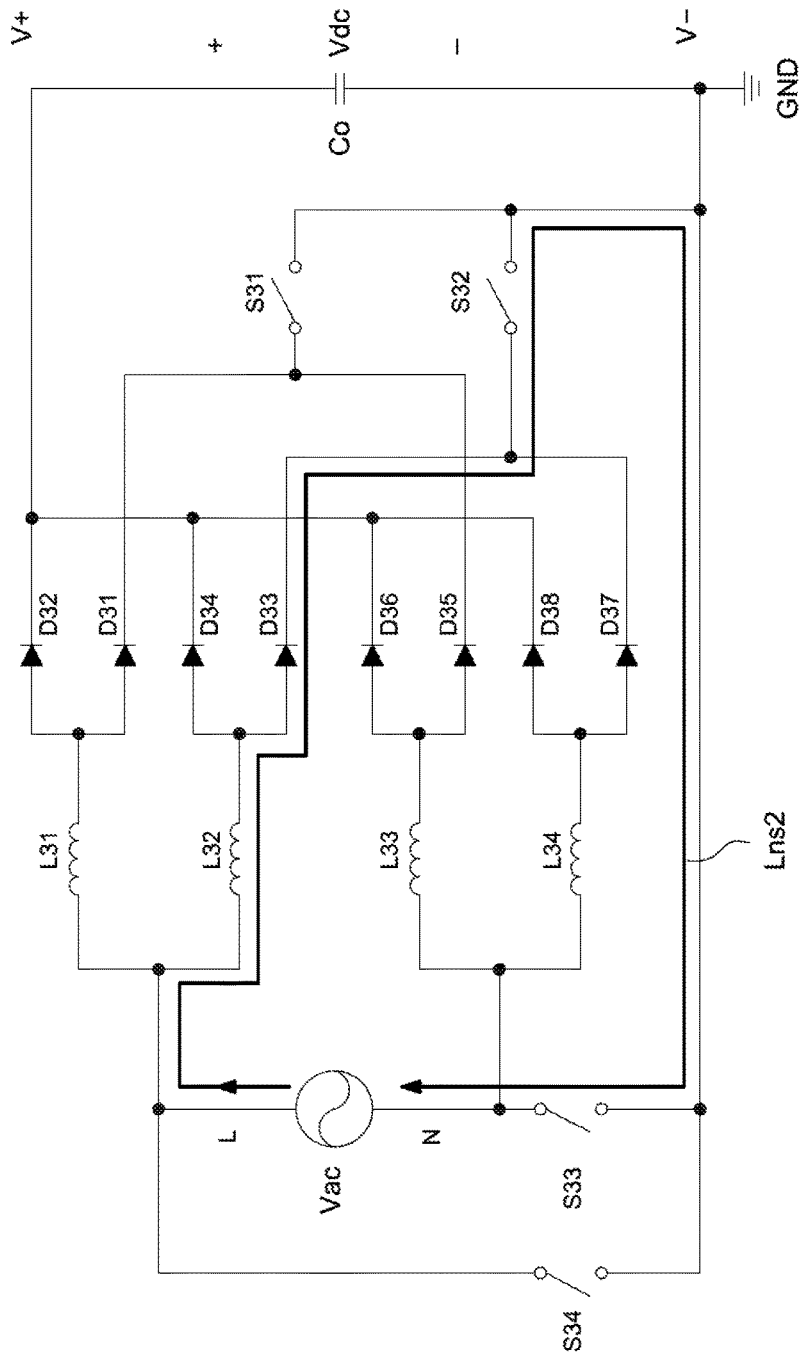
FIG. 4 is a schematic diagram showing the bridgeless interleaved PFC of the present invention, which is operated in a second energy-storage path with the second inductor.

FIG. 4 is a schematic diagram showing the bridgeless interleaved PFC of the present invention, which is operated in a second energy-storage path with the second inductor L32. When the AC power source Vac is in positive-half cycle (the positive-half control switch S33 is turned on) and the second inductor L32 is in energy-storage operation, the line end L, the second inductor L32, the third diode D33, the second power switch S32, the ground end GND, the positive-half control switch S33 and the neutral end N form a second energy-storage path Lns2.

Figure 5:
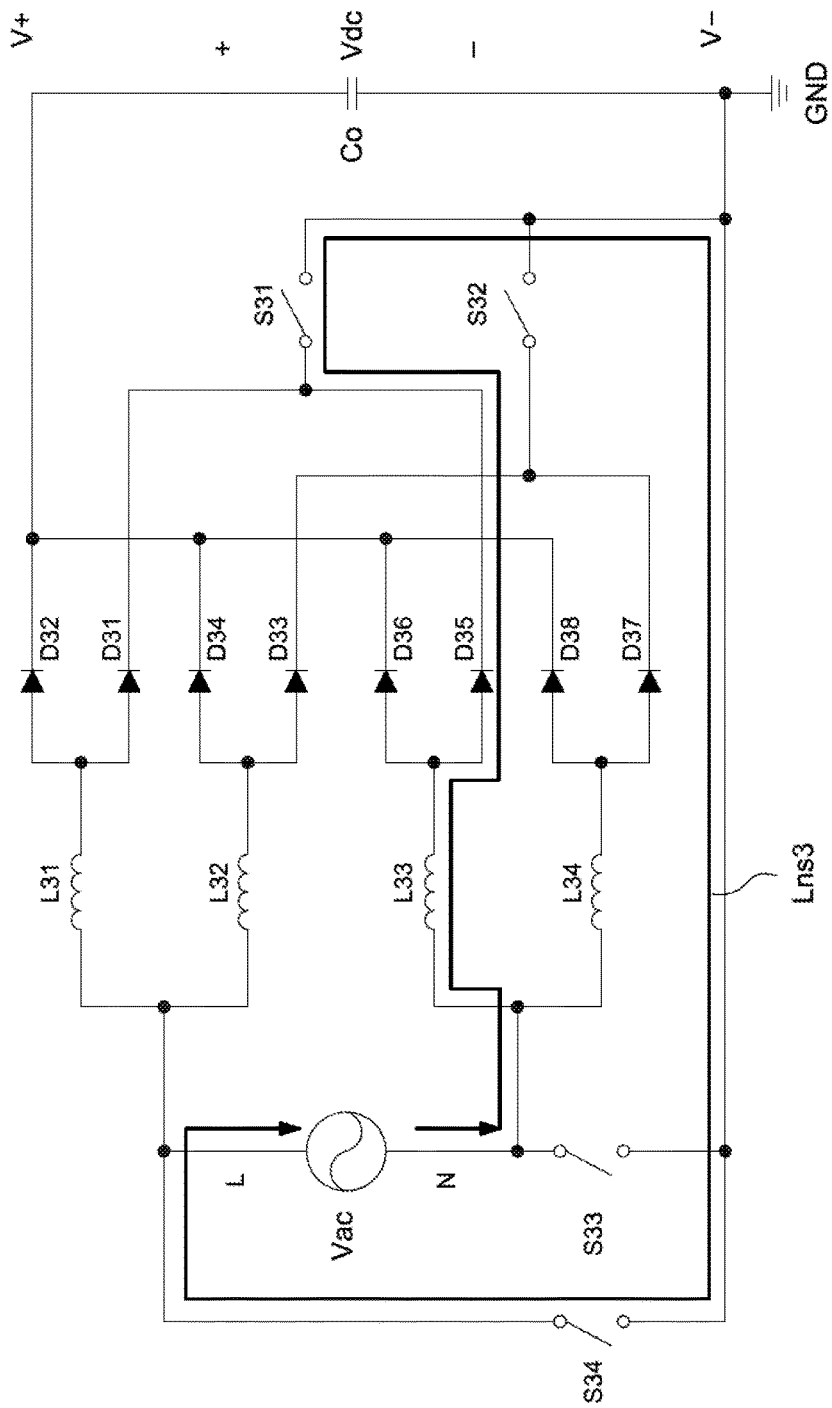
FIG. 5 is a schematic diagram showing the bridgeless interleaved PFC of the present invention, which is operated in a third energy-storage path with the third inductor.

FIG. 5 is a schematic diagram showing the bridgeless interleaved PFC of the present invention, which is operated in a third energy-storage path with the third inductor L33. When the AC power source Vac is in negative-half cycle (the negative-half control switch S34 is turned on) and the third inductor L33 is in energy-storage operation, the neutral end N, the third inductor L33, the fifth diode D33, the first power switch S31, the ground end GND, the negative-half control switch S34 and the line end L form a third energy-storage path Lns3.

Figure 6:
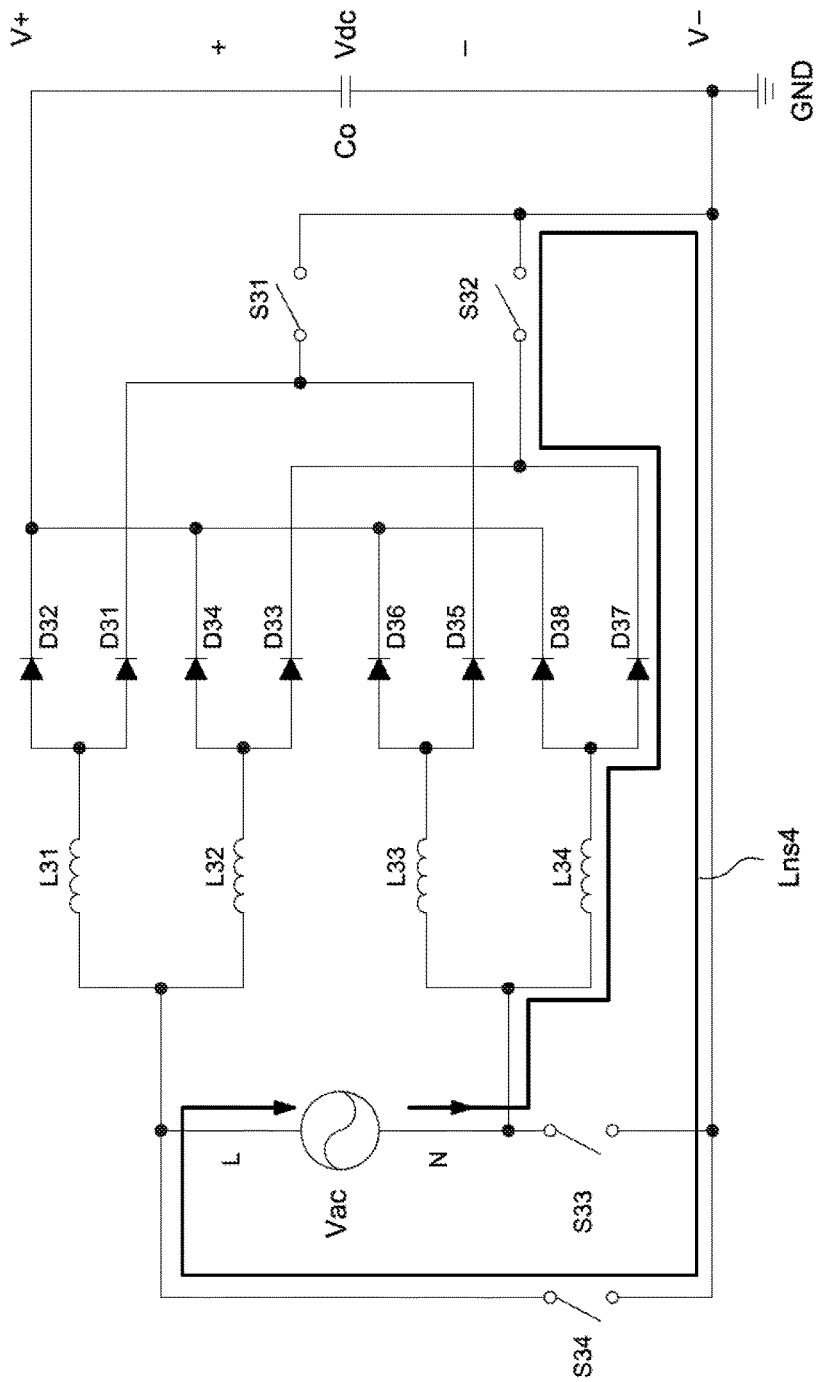
FIG. 6 is a schematic diagram showing the bridgeless interleaved PFC of the present invention, which is operated in a fourth energy-storage path with the fourth inductor.

FIG. 6 is a schematic diagram showing the bridgeless interleaved PFC of the present invention, which is operated in a fourth energy-storage path with the fourth inductor L34. When the AC power source Vac is in negative-half cycle (the negative-half control switch S34 is turned on) and the fourth inductor L34 is in energy-storage operation, the neutral end N, the fourth inductor L34, the seventh diode D37, the second power switch S32, the ground end GND, the negative-half control switch S34 and the line end L form a fourth energy-storage path Lns4.

Figure 7:
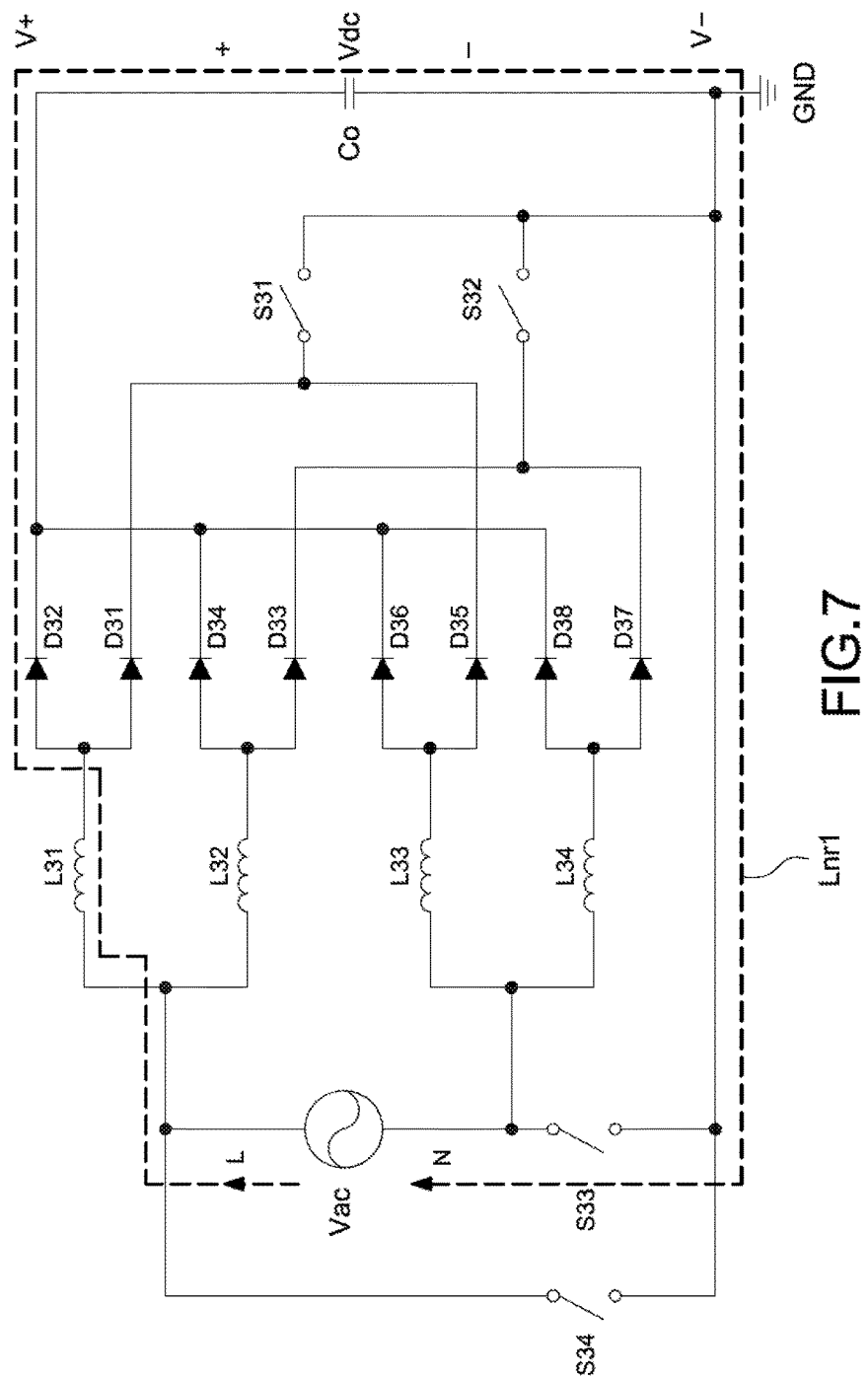
FIG. 7 is a schematic diagram showing the bridgeless interleaved PFC of the present invention, which is operated in a first energy-release path with the first inductor.

FIG. 7 is a schematic diagram showing the bridgeless interleaved PFC of the present invention, which is operated in a first energy-release path with the first inductor L31. When the AC power source Vac is in positive-half cycle (the positive-half control switch S33 is turned on) and the first inductor L31 is in energy-release operation, the first inductor L31, the second diode D32, the output capacitance Co, the ground end GND, the positive-half control switch S33, the neutral end N, and the line end L form a first energy-release path Lnr1.

Figure 8:
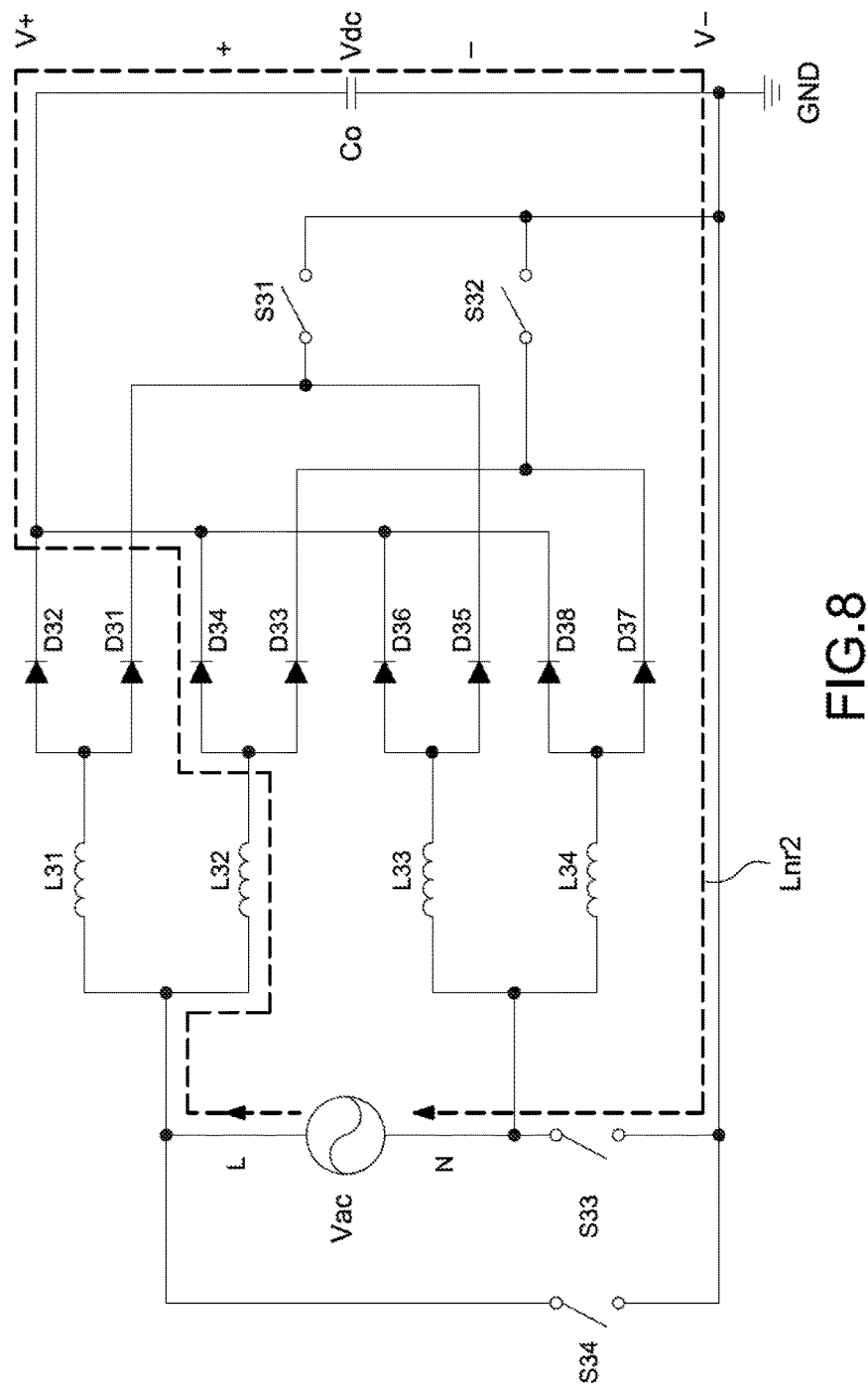
FIG. 8 is a schematic diagram showing the bridgeless interleaved PFC of the present invention, which is operated in a second energy-release path with the second inductor.

FIG. 8 is a schematic diagram showing the bridgeless interleaved PFC of the present invention, which is operated in a second energy-release path with the second inductor L32. When the AC power source Vac is in positive-half cycle (the positive-half control switch S33 is turned on) and the second inductor L32 is in energy-release operation, the second inductor L32, the fourth diode D34, the output capacitance Co, the ground end GND, the positive-half control switch S33, the neutral end N, and the line end L form a second energy-release path Lnr2.

Figure 9:
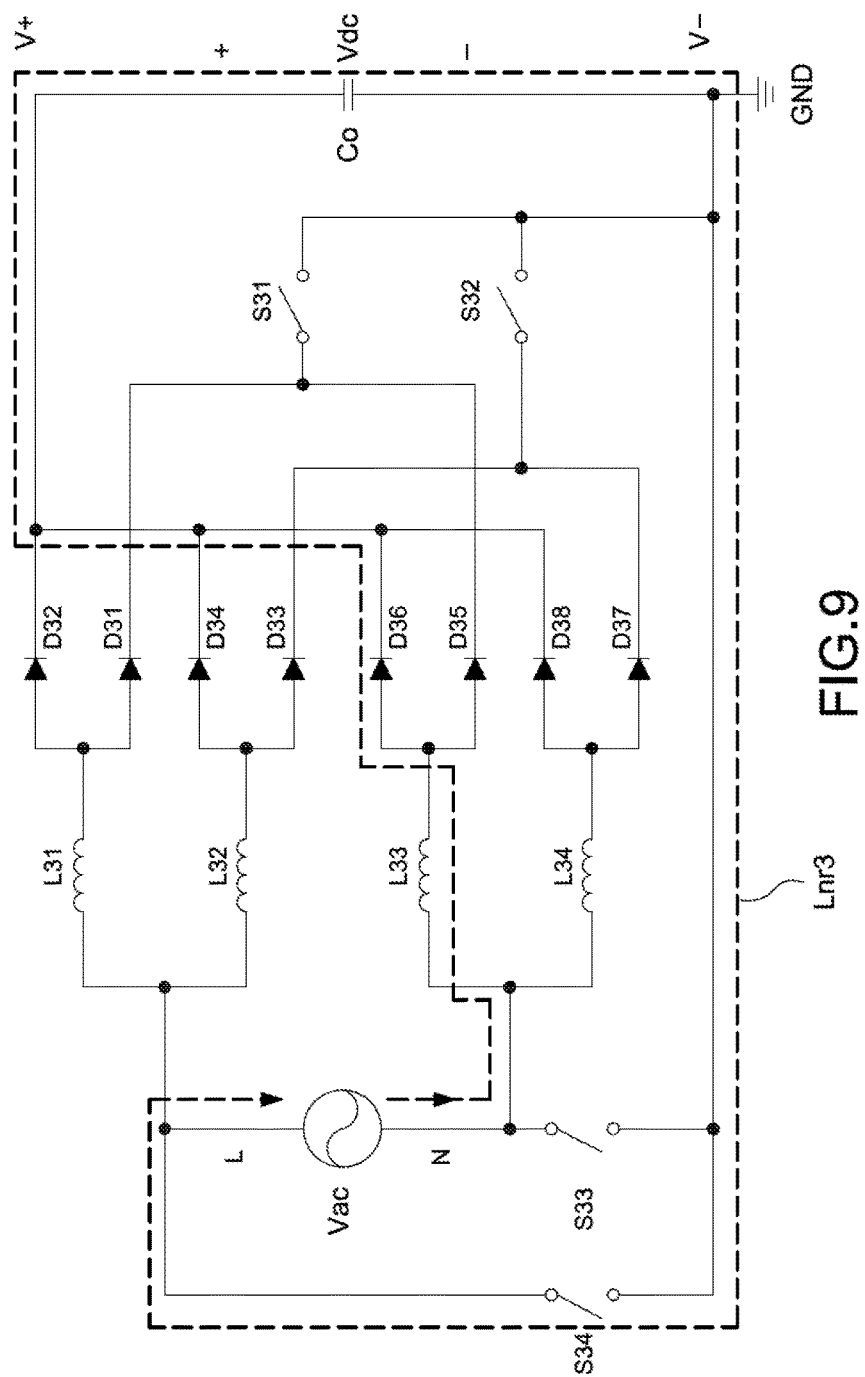
FIG. 9 is a schematic diagram showing the bridgeless interleaved PFC of the present invention, which is operated in a third energy-release path with the third inductor.

FIG. 9 is a schematic diagram showing the bridgeless interleaved PFC of the present invention, which is operated in a third energy-release path with the third inductor L33. When the AC power source Vac is in negative-half cycle (the negative-half control switch S34 is turned on) and the third inductor L33 is in energy-release operation, the third inductor L33, the sixth diode D36, the output capacitance Co, the ground end GND, the negative-half control switch S34, the line end L, and the neutral end N form a third energy-release path Lnr3.

Figure 10:
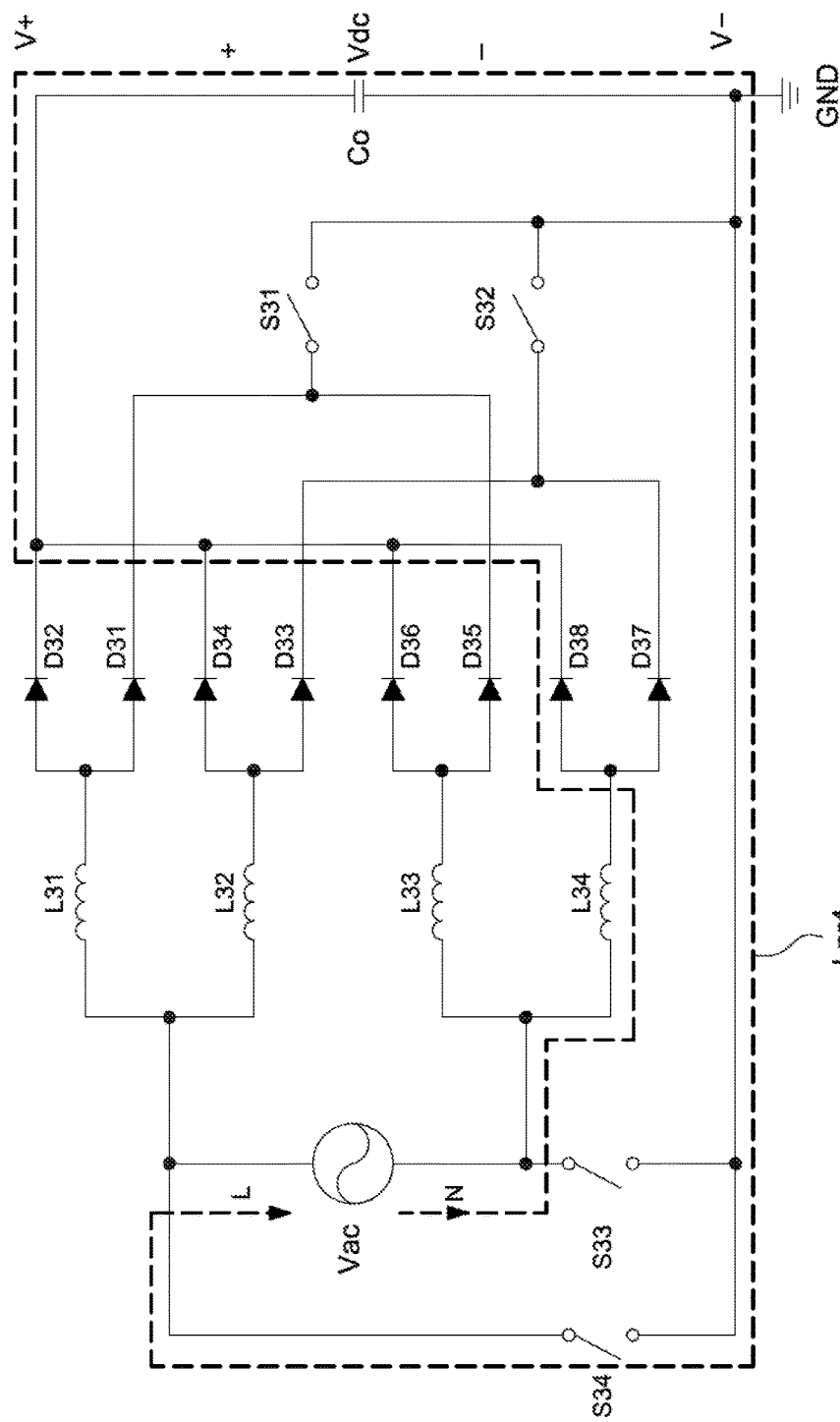
FIG. 10 is a schematic diagram showing the bridgeless interleaved PFC of the present invention, which is operated in a fourth energy-release path with the fourth inductor.

FIG. 10 is a schematic diagram showing the bridgeless interleaved PFC of the present invention, which is operated in a fourth energy-release path with the fourth inductor L34. When the AC power source Vac is in negative-half cycle (the negative-half control switch S34 is turned on) and the fourth inductor L34 is in energy-release operation, the fourth inductor L34, the eighth diode D38, the output capacitance Co, the ground end GND, the negative-half control switch S34, the line end L, and the neutral end N form a fourth energy-release path Lnr4.

As described above, FIGS. 3 to 6 depict the energy-storage operations for the first inductor L31 to the fourth inductor L34, while FIGS. 7 to 10 depict the energy-release operations for the first inductor L31 to the fourth inductor L34. The complete operation stages for the bridgeless interleaved PFC of the present invention will be described with reference to Tables 1 and 2 below.

TABLE 1

|  | S33 | S34 | S31 | S32 | L31 | L32 | L33 | L34 |
|---|---|---|---|---|---|---|---|---|
| Stage 1 | ON | OFF | ON | OFF | energy storage | — | — |  |
| Stage 2 |  |  | OFF | OFF | energy release | — |  |  |
| Stage 3 |  |  | OFF | ON | energy release | energy storage |  |  |
| Stage 4 |  |  | OFF | OFF | energy release | energy release |  |  |
| Stage 5 |  |  | ON | OFF | energy storage | energy release |  |  |
| Stage 6 | OFF | ON | ON | OFF |  |  | energy storage | — |
| Stage 7 |  |  | OFF | OFF |  |  | energy release | — |
| Stage 8 |  |  | OFF | ON |  |  | energy release | energy storage |
| Stage 9 |  |  | OFF | OFF |  |  | energy release | energy release |
| Stage 10 |  |  | ON | OFF |  |  | energy storage | energy release |

TABLE 2

|  | D31 | D32 | D33 | D34 | D35 | D36 | D37 | D38 |
|---|---|---|---|---|---|---|---|---|
| Stage 1 | ON | OFF | OFF | OFF | OFF |  |  |  |
| Stage 2 | OFF | ON | OFF | OFF |  |  |  |  |
| Stage 3 | OFF | ON | ON | OFF |  |  |  |  |
| Stage 4 | OFF | ON | OFF | ON |  |  |  |  |
| Stage 5 | ON | OFF | OFF | ON |  |  |  |  |
| Stage 6 | OFF |  |  |  | ON | OFF | OFF | OFF |
| Stage 7 |  |  |  |  | OFF | ON | OFF | OFF |
| Stage 8 |  |  |  |  | OFF | ON | ON | OFF |
| Stage 9 |  |  |  |  | OFF | ON | OFF | ON |
| Stage 10 |  |  |  |  | ON | OFF | OFF | ON |

(1) Stage 1

In this stage, the positive-half control switch S33 is turned on, the negative-half control switch S34 is turned off, the first power switch S31 is turned on, the second power switch S32 is turned off, the first inductor L31 is in energy-storage operation, and the first diode D31 is turned on. Namely, the bridgeless interleaved PFC of the present invention is operated in a first energy-storage path Lns1 with the first inductor L31 as depicted in FIG. 3 and the detailed description is omitted here for brevity.

(2) Stage 2

In this stage, the positive-half control switch S33 is turned on, the negative-half control switch S34 is turned off, the first power switch S31 is turned off, the second power switch S32 is turned off, the first inductor L31 is in energy-release operation, and the second diode D32 is turned on. Namely, the bridgeless interleaved PFC of the present invention is operated in a first energy-release path Lnr1 with the first inductor L31 as depicted in FIG. 7 and the detailed description is omitted here for brevity.

(3) Stage 3

Figure 11:
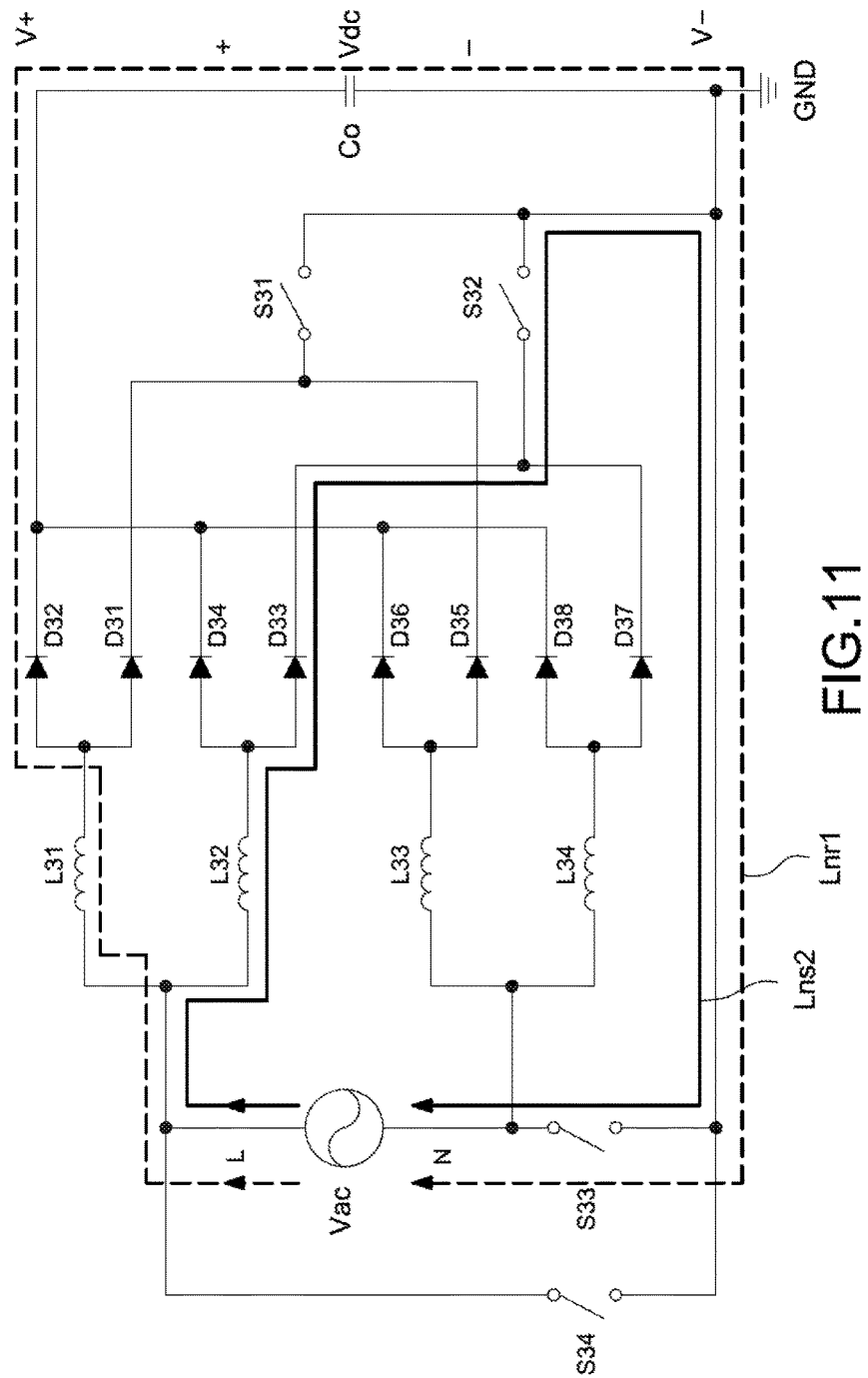
FIG. 11 is a schematic diagram showing the bridgeless interleaved PFC of the present invention, which is operated in first energy-release path with the first inductor and the second energy-storage path with the second inductor.

As shown in FIG. 11, the bridgeless interleaved PFC of the present invention is operated in a first energy-release path with the first inductor L31 and the second energy-storage path with the second inductor L32. In this stage, the positive-half control switch S33 is turned on, the negative-half control switch S34 is turned off, the first power switch S31 is turned off, the second power switch S32 is turned on, the first inductor L31 is in energy-release operation, the second inductor L32 is in energy-storage operation, the second diode D32 is turned on and the third diode D33 is turned on.

(4) Stage 4

Figure 12:
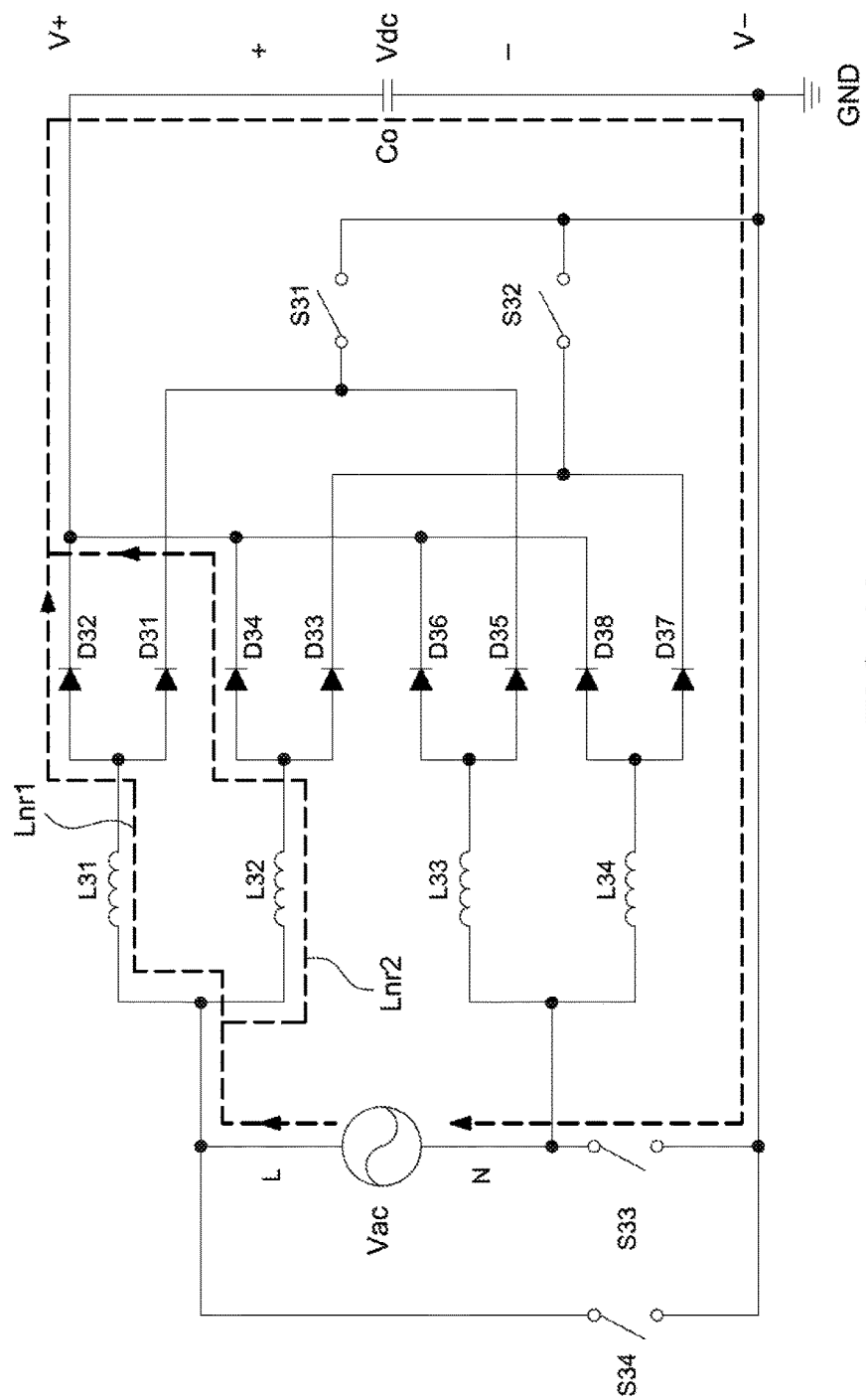
FIG. 12 is a schematic diagram showing the bridgeless interleaved PFC of the present invention, which is operated in first energy-release path with the first inductor and the second energy-release path with the second inductor.

As shown in FIG. 12, the bridgeless interleaved PFC of the present invention is operated in a first energy-release path with the first inductor L31 and the second energy-release path with the second inductor L32. In this stage, the positive-half control switch S33 is turned on, the negative-half control switch S34 is turned off, the first power switch S31 is turned off, the second power switch S32 is turned off, the first inductor L31 is in energy-release operation, the second inductor L32 is in energy-release operation, the second diode D32 is turned on and the fourth diode D34 is turned on.

(5) Stage 5

Figure 13:
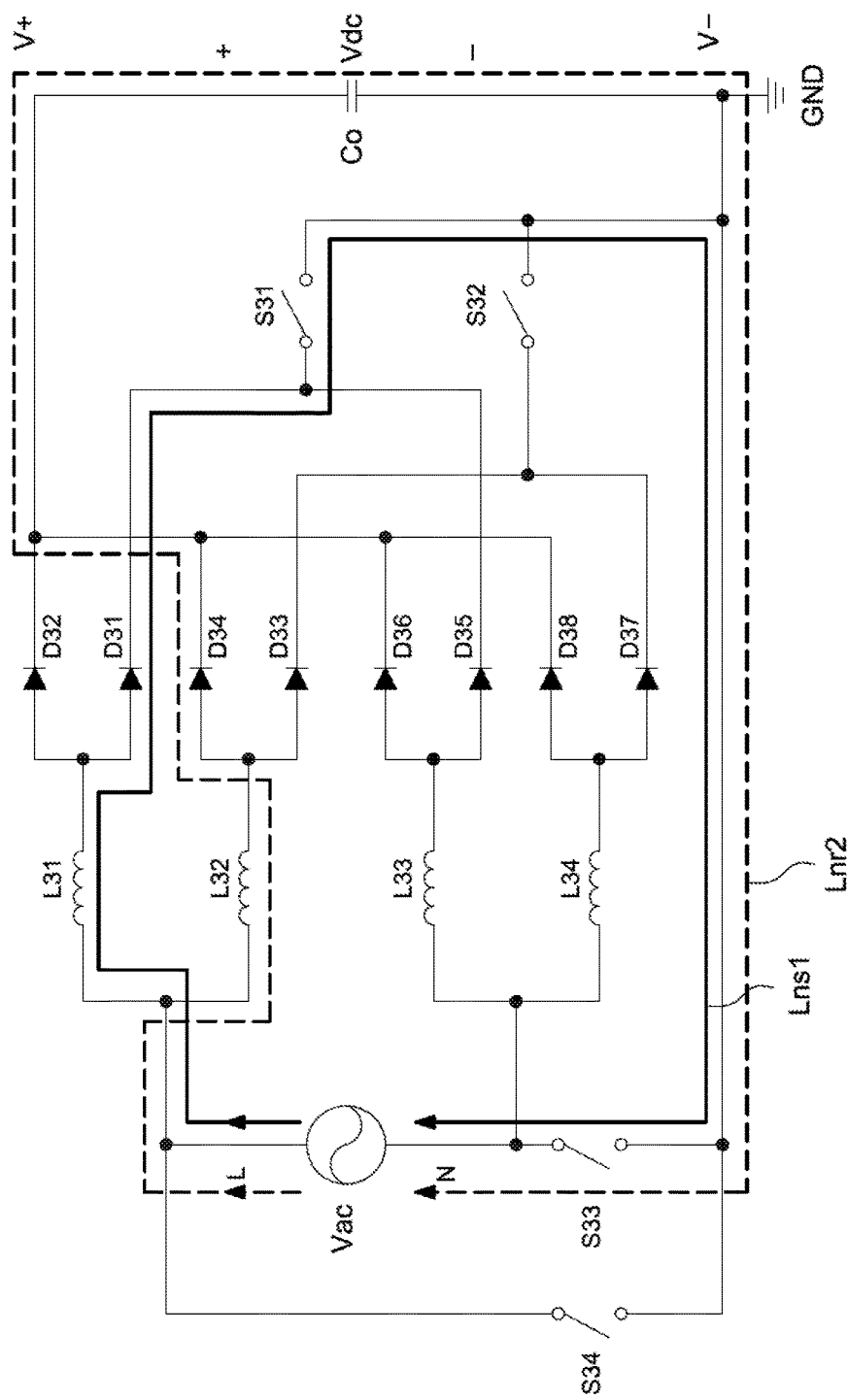
FIG. 13 is a schematic diagram showing the bridgeless interleaved PFC of the present invention, which is operated in first energy-storage path with the first inductor and the second energy-release path with the second inductor.

As shown in FIG. 13, the bridgeless interleaved PFC of the present invention is operated in a first energy-storage path with the first inductor L31 and the second energy-release path with the second inductor L32. In this stage, the positive-half control switch S33 is turned on, the negative-half control switch S34 is turned off, the first power switch S31 is turned on, the second power switch S32 is turned off, the first inductor L31 is in energy-storage operation, the second inductor L32 is in energy-release operation, the first diode D31 is turned on and the fourth diode D34 is turned on.

(6) Stage 6

In this stage, the positive-half control switch S33 is turned off, the negative-half control switch S34 is turned on, the first power switch S31 is turned on, the second power switch S32 is turned off, the third inductor L33 is in energy-storage operation, and the fifth diode D35 is turned on. Namely, the bridgeless interleaved PFC of the present invention is operated in a third energy-storage path Lns3 with the third inductor L33 as depicted in FIG. 5 and the detailed description is omitted here for brevity.

(7) Stage 7

In this stage, the positive-half control switch S33 is turned off, the negative-half control switch S34 is turned on, the first power switch S31 is turned off, the second power switch S32 is turned off, the third inductor L33 is in energy-storage operation, and the sixth diode D36 is turned on. Namely, the bridgeless interleaved PFC of the present invention is operated in a third energy-release path Lns3 with the third inductor L33 as depicted in FIG. 9 and the detailed description is omitted here for brevity.

(8) Stage 8

Figure 14:
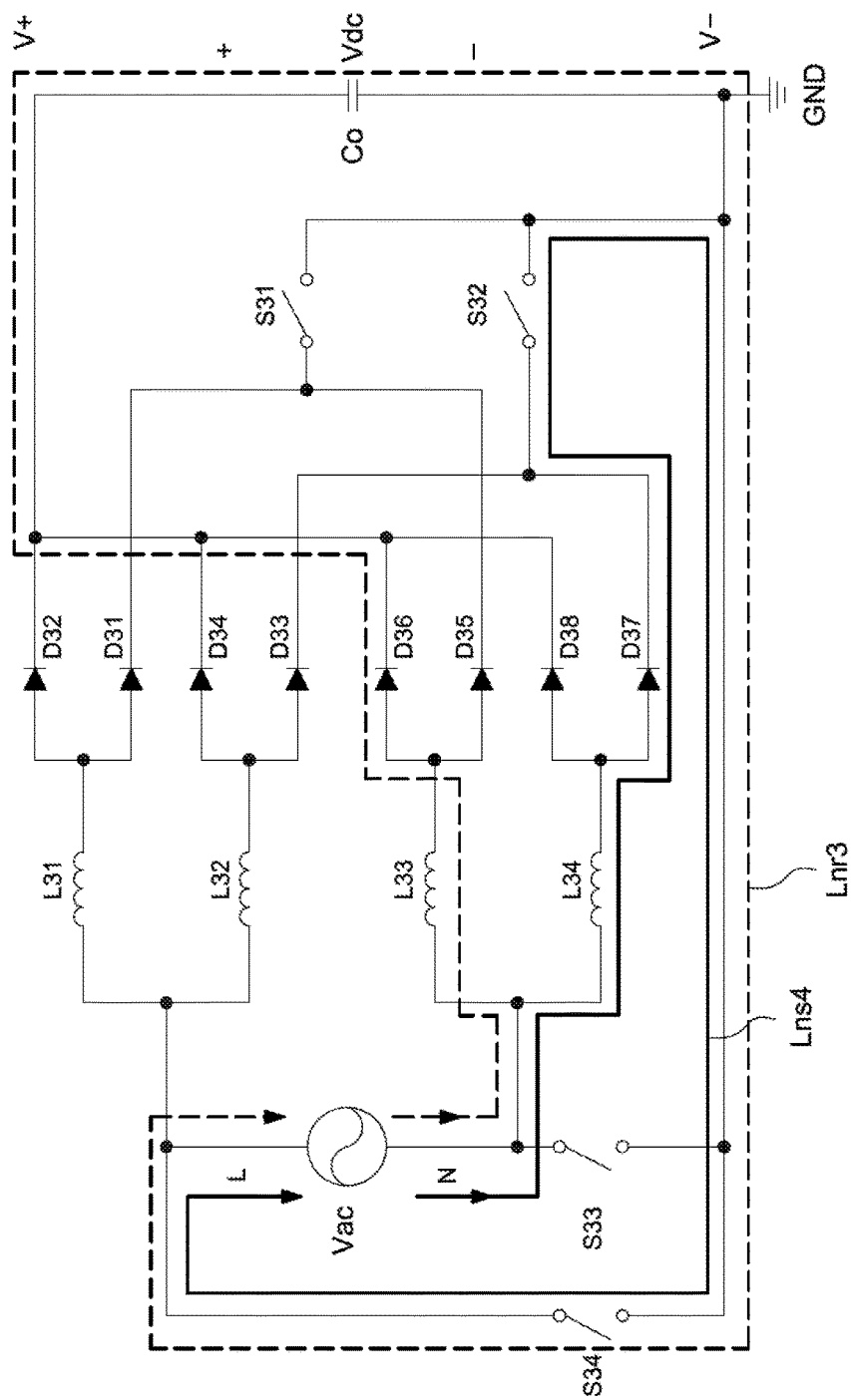
FIG. 14 is a schematic diagram showing the bridgeless interleaved PFC of the present invention, which is operated in third energy-release path with the third inductor and the fourth energy-storage path with the fourth inductor.

As shown in FIG. 14, the bridgeless interleaved PFC of the present invention is operated in a third energy-release path with the third inductor L33 and the forth energy-storage path with the fourth inductor L34. In this stage, the positive-half control switch S33 is turned off, the negative-half control switch S34 is turned on, the first power switch S31 is turned off, the second power switch S32 is turned on, the third inductor L33 is in energy-release operation, the fourth inductor L34 is in energy-storage operation, the sixth diode D36 is turned on and the seventh diode D37 is turned on.

(9) Stage 9

Figure 15:
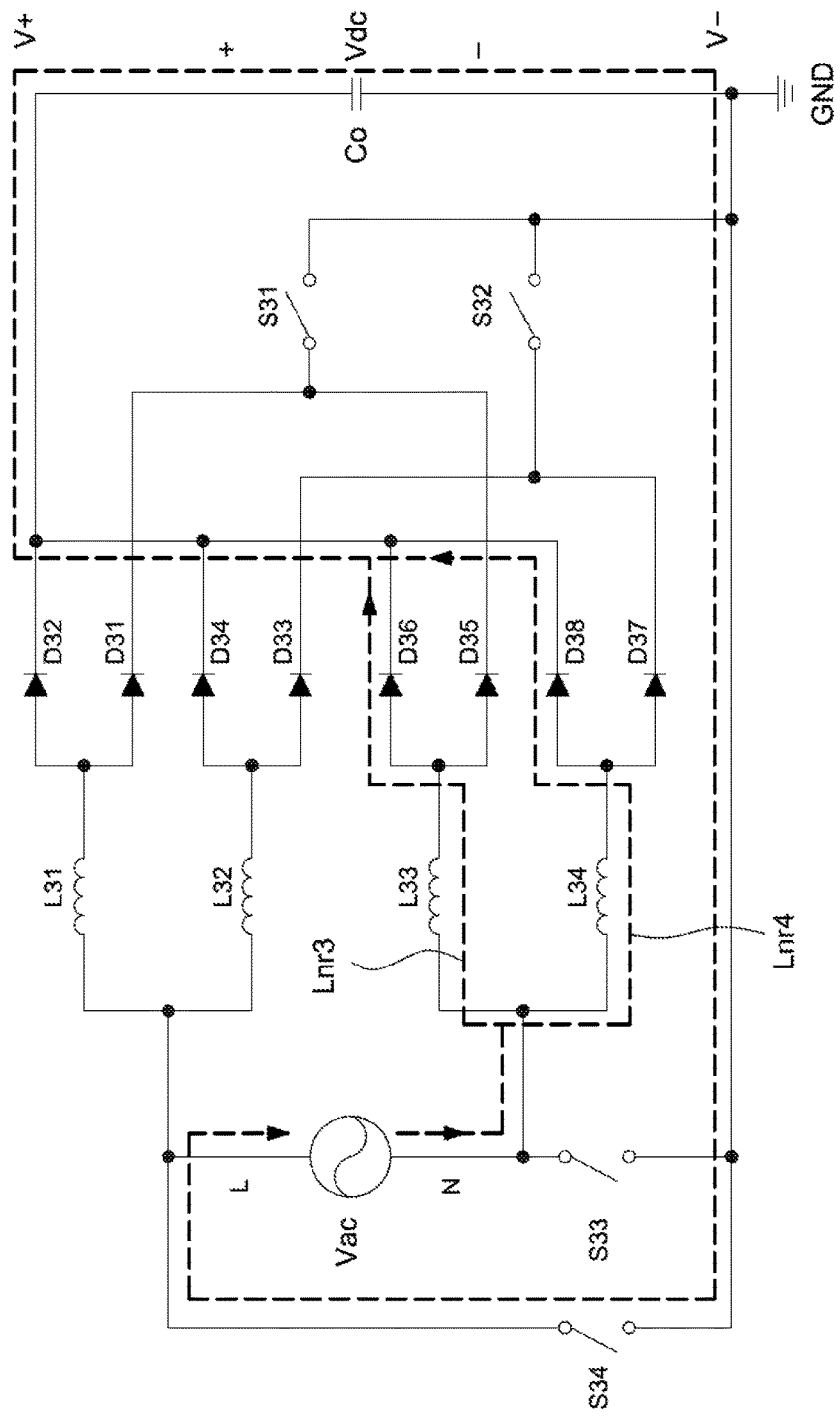
FIG. 15 is a schematic diagram showing the bridgeless interleaved PFC of the present invention, which is operated in third energy-release path with the third inductor and the fourth energy-release path with the fourth inductor.

As shown in FIG. 15, the bridgeless interleaved PFC of the present invention is operated in a third energy-release path with the third inductor L33 and the forth energy-release path with the fourth inductor L34. In this stage, the positive-half control switch S33 is turned off, the negative-half control switch S34 is turned on, the first power switch S31 is turned off, the second power switch S32 is turned off, the third inductor L33 is in energy-release operation, the fourth inductor L34 is in energy-release operation, the sixth diode D36 is turned on and the eighth diode D38 is turned on.

(10) Stage 10

Figure 16:
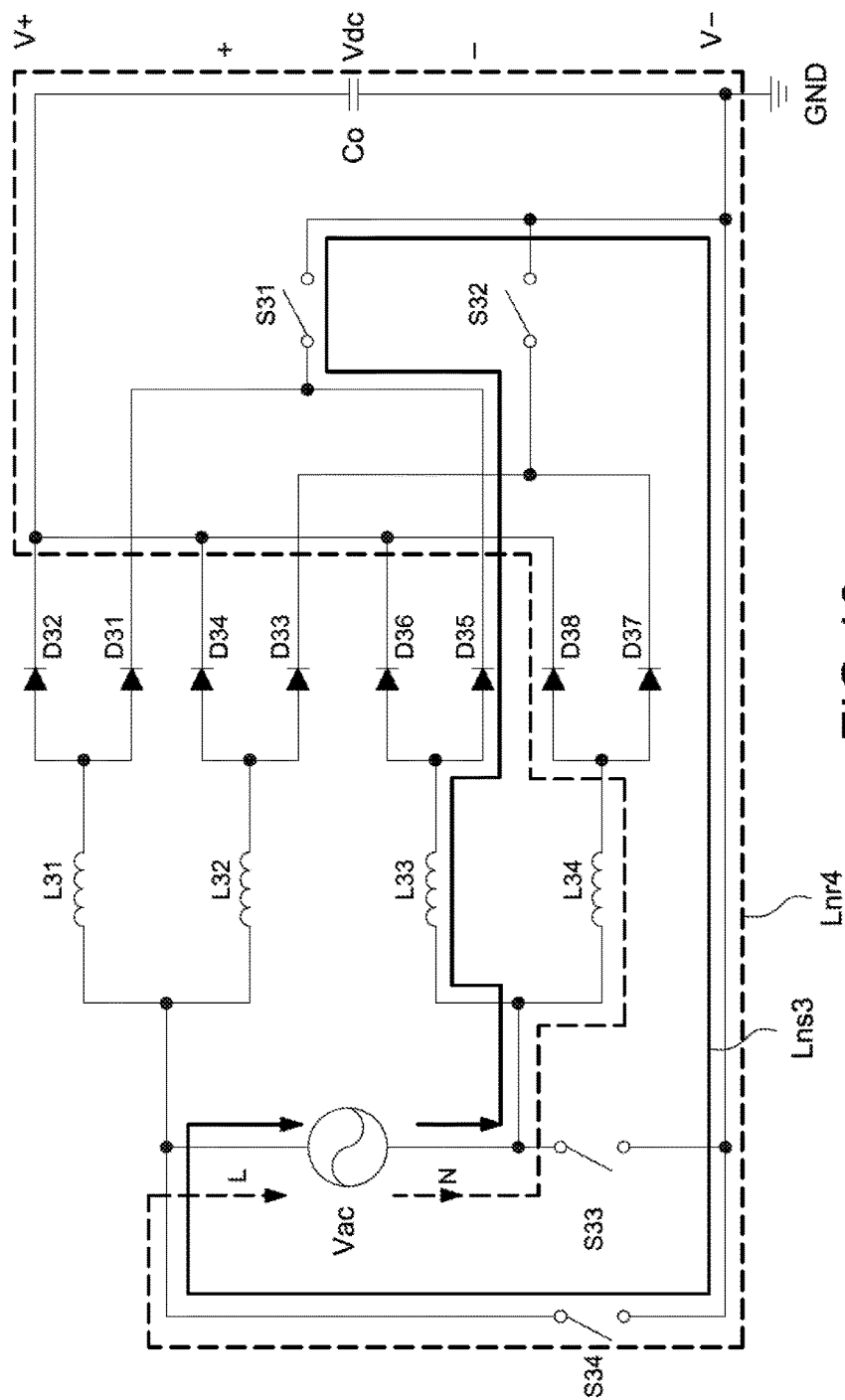
FIG. 16 is a schematic diagram showing the bridgeless interleaved PFC of the present invention, which is operated in third energy-storage path with the third inductor and the fourth energy-release path with the fourth inductor.

As shown in FIG. 16, the bridgeless interleaved PFC of the present invention is operated in a third energy-storage path with the third inductor L33 and the forth energy-release path with the fourth inductor L34. In this stage, the positive-half control switch S33 is turned off, the negative-half control switch S34 is turned on, the first power switch S31 is turned on, the second power switch S32 is turned off, the third inductor L33 is in energy-storage operation, the fourth inductor L34 is in energy-release operation, the fifth diode D35 is turned on and the eighth diode D38 is turned on.

To sum up, the bridgeless interleaved PFC of the present invention has repeated operations in above-described manner and can provide interleaved power factor correction function.

Figure 17:
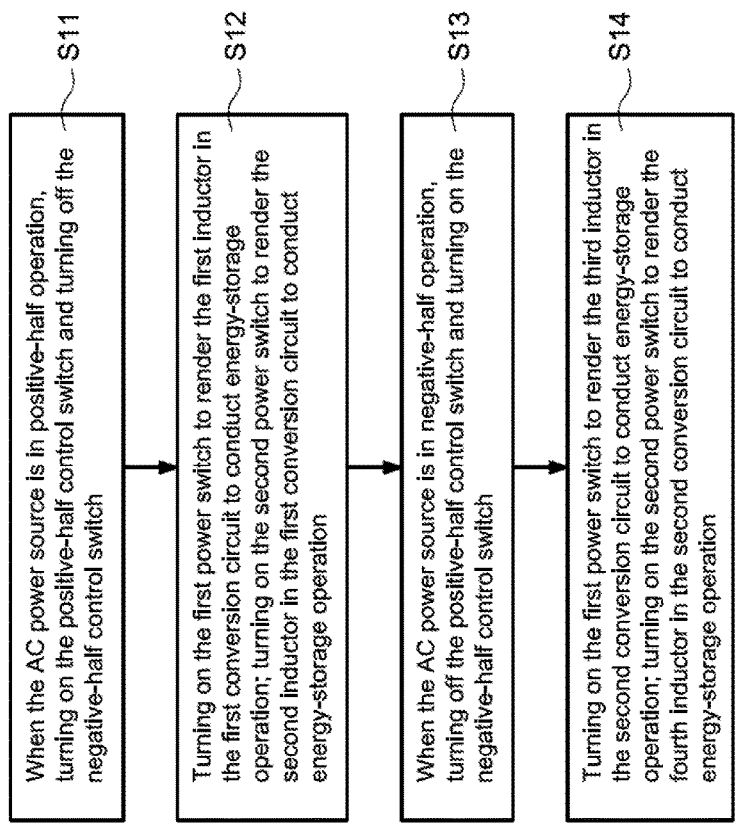
FIG. 17 shows the flowchart of method for controlling the bridgeless interleaved PFC of the present invention.

FIG. 17 shows the flowchart of method for controlling the bridgeless interleaved PFC of the present invention. The bridgeless interleaved PFC is adapted to convert an AC power source into a DC power source and the circuit architecture thereof can be referred to FIG. 2 and related description. Therefore, the detailed description of the bridgeless interleaved PFC is omitted here for brevity. The method for controlling the bridgeless interleaved PFC of the present invention comprises following steps:

When the AC power source is in positive-half operation, the positive-half control switch is turned on and the negative-half control switch is turned off (step S11). Afterward, the method turns on the first power switch to render the first inductor in the first conversion circuit to conduct energy-storage operation and turns on the second power switch to render the second inductor in the first conversion circuit to conduct energy-storage operation (Step S12). Moreover, the method then turns off the first power switch to render the first inductor to conduct energy-release operation and turns off the second power switch to render the second inductor to conduct energy-release operation.

Afterward, when the AC power source is in negative-half operation, the method turns off the positive-half control switch and turns on the negative-half control switch (step S13). Afterward, the method turns on the first power switch to render the third inductor in the second conversion circuit to conduct energy-storage operation and turns on the second power switch to render the fourth inductor in the second conversion circuit to conduct energy-storage operation (step 14). Moreover, the method then turns off the first power switch to render the third inductor to conduct energy-release operation and turns off the second power switch to render the fourth inductor to conduct energy-release operation.

Therefore, when the he AC power source is in positive-half operation, the positive-half control switch is turned on to provide control for the positive-half cycle; when the he AC power source is in negative-half operation, the negative-half control switch is turned on to provide control for the negative-half cycle. Besides, the first power switch and the second first power switch are switched between turning on and turning off to realize the function of interleaved power factor correction.

The present invention has following features and advantages:

1. The bridgeless interleaved PFC of the present invention has two interleaved PFCs in parallel connection. The two PFCs can share part of the circuit elements to reduce the number of the power semiconductor switches. The voltage/current stress to the components and the switching loss can be reduced, thus enhancing power effectiveness and operation efficiency.
2. The positive-half control switch S33 and the negative-half control switch S34 are used as phase-switching switch. When the AC power source is in positive-half operation, the positive-half control switch S33 is turned on and the negative-half control switch S34 is turned off to ensure an equipotential is kept between the neutral end N and the voltage reference end (the ground end GND). When the AC power source is in negative-half operation, the positive-half control switch S33 is turned off and the negative-half control switch S34 is turned on to ensure an equipotential is kept between the line end L and the voltage reference end (the ground end GND). Therefore, the EMI problem caused by floating voltage and parasitic capacitance can be solved to enhance circuit performance.
3. The topology of the bridgeless interleaved PFC of the present invention can be flexibly adapted for Continuous Conduction Mode (CCM), Discontinuous Conduction Mode (DCM) and Critical Conduction Mode (CRM) operation.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A bridgeless interleaved power factor corrector (PFC) adapted to convert an AC power source into a DC power source, the bridgeless interleaved PFC comprising:
    a first conversion circuit coupled to a line end of the AC power source and comprising two positive-half operation units, the two positive-half operation units coupled to a positive voltage end with respect to a ground end;
    a second conversion circuit coupled to a neutral end of the AC power source and in parallel connection with the first conversion circuit, the second conversion circuit comprising two negative-half operation units coupled to the positive voltage end;

a first power switch coupled to one of the two positive-half operation units and one of the two negative-half operation units, and wherein the first power switch is disposed between the one of the two positive-half operation units and the ground end and disposed between the one of the two negative-half operation units and the ground end;

a second power switch coupled to the other one of the two positive-half operation units and the other one of the two negative-half operation units, and where the second power switch is disposed between the other one of the two positive-half operation units and the ground end and disposed between the other one of the two negative-half operation units and the ground end;

a positive-half control switch coupled between the neutral end and the ground end; and a negative-half control switch coupled between the line end and the ground end.

2. The bridgeless interleaved PFC in claim 1, further comprising:

an output capacitance coupled between the positive voltage end and the ground end, and providing the DC power source.

3. The bridgeless interleaved PFC in claim 2, wherein the two positive-half operation units comprises a first positive-half operation unit and a second positive-half operation unit, the first positive-half operation unit comprising:

a first diode;

a second diode coupled to the first diode to form a first parallel branch, the first parallel branch coupled to the positive voltage end and the first power switch; and a first inductor in serial connection with the first parallel branch;

the second positive-half operation unit comprising:

a third diode;

a fourth diode coupled to the third diode to form a second parallel branch, the second parallel branch coupled to the positive voltage end and the second power switch; and a second inductor in serial connection with the second parallel branch;

wherein the two negative-half operation units comprises a first negative-half operation unit and a second negative-half operation unit;

the first negative-half operation unit comprising:

a fifth diode;

a sixth diode coupled to the fifth diode to form a third parallel branch, the third parallel branch coupled to the positive voltage end and the first power switch; and a third inductor in serial connection with the third parallel branch;

the second negative-half operation unit comprising:

a seventh diode;

an eighth diode coupled to the seventh diode to form a fourth parallel branch, the fourth parallel branch coupled to the positive voltage end and the second power switch; and a fourth inductor in serial connection with the fourth parallel branch.

4. The bridgeless interleaved PFC in claim 3, wherein a cathode of the second diode, a cathode of the fourth diode, a cathode of the sixth diode, a cathode of the eighth diode are coupled to the positive voltage end; a cathode of the first diode and a cathode of the fifth diode are coupled to a non-ground end of the first power switch; a cathode of the third diode and a cathode of the seventh diode are coupled to a non-ground end of the second power switch.

5. The bridgeless interleaved PFC in claim 3, when the AC power source is in positive-half operation, the positive-half control switch is turned on, the negative-half control switch is turned off, the first power switch and the second power switch are switched between turning on and turning off; when the AC power source is in negative-half operation, the positive-half control switch is turned off, the negative-half control switch is turned on, the first power switch and the second power switch are switched between turning on and turning off.

6. The bridgeless interleaved PFC in claim 5, wherein when the positive-half control switch is turned on and the first power switch is turned on, the first diode is turned on and the first inductor is in energy-storage operation;

when the positive-half control switch is turned on and the second power switch is turned on, the third diode is turned on and the second inductor is in energy-storage operation; and when the negative-half control switch is turned on and the first power switch is turned on, the fifth diode is turned on and the third inductor is in energy-storage operation; and when the negative-half control switch is turned on and the second power switch is turned on, the seventh diode is turned on and the fourth inductor is in energy-storage operation.

7. The bridgeless interleaved PFC in claim 5, wherein when the positive-half control switch is turned on and the first power switch is turned off, the second diode is turned on and the first inductor is in energy-release operation; when the positive-half control switch is turned on and the second power switch is turned off, the fourth diode is turned on and the second inductor is in energy-release operation; and when the negative-half control switch is turned on and the first power switch is turned off, the sixth diode is turned on and the third inductor is in energy-release operation; and when the negative-half control switch is turned on and the second power switch is turned off, the eighth diode is turned on and the fourth inductor is in energy-release operation.

8. The bridgeless interleaved PFC in claim 6, when the first inductor is in energy-storage operation, the line end, the first inductor, the first diode, the first power switch, the ground end, the positive-half control switch and the neutral end form a first energy-storage path;

when the second inductor is in energy-storage operation, the line end, the second inductor, the third diode, the second power switch, the ground end, the positive-half control switch and the neutral end form a second energy-storage path;

when the third inductor is in energy-storage operation, the neutral end, the third inductor, the fifth diode, the first power switch, the ground end, the negative-half control switch and the line end form a third energy-storage path; and when the fourth inductor is in energy-storage operation, the neutral end, the fourth inductor, the seventh diode, the second power switch, the ground end, the negative-half control switch and the line end form a fourth energy-storage path.

9. The bridgeless interleaved PFC in claim 7, when the first inductor is in energy-release operation, the first inductor, the second diode, the output capacitance, the ground end, the positive-half control switch, the neutral end, and the line end form a first energy-release path;

when the second inductor is in energy-release operation, the second inductor, the fourth diode, the output capacitance, the ground end, the positive-half control switch, the neutral end, and the line end form a second energy-release path;

when the third inductor is in energy-release operation, the third inductor, the sixth diode, the output capacitance, the ground end, the negative-half control switch, the line end, and the neutral end form a third energy-release path; and when the fourth inductor is in energy-release operation, the fourth inductor, the eighth diode, the output capacitance, the ground end, the negative-half control switch, the line end, and the neutral end form a fourth energy-release path.

10. A method for controlling bridgeless interleaved power factor corrector (PFC), the bridgeless interleaved PFC converting an AC power source into a DC power source and the bridgeless interleaved PFC comprising a first conversion circuit coupled to a line end of the AC power source, a second conversion circuit coupled to a neutral end of the AC power source, a first power switch and a second power switch coupled between the first conversion circuit, the second conversion circuit and the ground end, a positive-half control switch coupled between the neutral end and the ground end and a negative-half control switch coupled between the line end and the ground end, the method comprising:

(a) when the AC power source is in positive-half operation, turning on the positive-half control switch and turning off the negative-half control switch;

(b) turning on the first power switch to render a first inductor in the first conversion circuit to conduct energy-storage operation; turning on the second power switch to render a second inductor in the first conversion circuit to conduct energy-storage operation;

(c) when the AC power source is in negative-half operation, turning off the positive-half control switch and turning on the negative-half control switch; and (d) turning on the first power switch to render a third inductor in the second conversion circuit to conduct energy-storage operation; turning on the second power switch to render a fourth inductor in the second conversion circuit to conduct energy-storage operation.

11. The method in claim 10, wherein the step (b) further comprises:

(b') turning off the first power switch to render the first inductor to conduct energy-release operation; turning off the second power switch to render the second inductor to conduct energy-release operation;

wherein the step (d) further comprises:

(d') turning off the first power switch to render the third inductor to conduct energy-release operation; turning off the second power switch to render the fourth inductor to conduct energy-release operation.

12. The method in claim 10, further comprising:

providing two positive-half operation units in the first conversion circuit and coupling the two positive-half operation units to a positive voltage end with respect to the ground end;

providing two negative-half operation units in the second conversion circuit and coupling the two negative-half operation units to the positive voltage end;

coupling the first power switch to one of the two positive-half operation units and one of the two negative-half operation units and disposing the first power switch between the one of the two positive-half operation units and the ground end and disposing the first power switch between the one of the two negative-half operation units and the ground end;

coupling the second power switch to the other one of the two positive-half operation units and the other one of the two negative-half operation units and disposing the second power switch between the other one of the two positive-half operation units and the ground end and disposing the second power switch between the other one of the two negative-half operation units and the ground end.

13. The method in claim 12, further comprising:

providing an output capacitance coupled between the positive voltage end and the ground end and the output capacitance providing the DC power source.

14. The method in claim 13, wherein the two positive-half operation units comprises a first positive-half operation unit and a second positive-half operation unit, the first positive-half operation unit comprising:

a first diode;

a second diode coupled to the first diode to form a first parallel branch, the first parallel branch coupled to the positive voltage end and the first power switch; and a first inductor in serial connection with the first parallel branch;

the second positive-half operation unit comprising:

a third diode;

a fourth diode coupled to the third diode to form a second parallel branch, the second parallel branch coupled to the positive voltage end and the second power switch; and a second inductor in serial connection with the second parallel branch;

the two negative-half operation units comprises a first negative-half operation unit and a second negative-half operation unit;

the first negative-half operation unit comprising:

a fifth diode;

a sixth diode coupled to the fifth diode to form a third parallel branch, the third parallel branch coupled to the positive voltage end and the first power switch; and a third inductor in serial connection with the third parallel branch;

the second negative-half operation unit comprising:

a seventh diode;

an eighth diode coupled to the seventh diode to form a fourth parallel branch, the fourth parallel branch coupled to the positive voltage end and the second power switch; and a fourth inductor in serial connection with the fourth parallel branch.

15. The method in claim 14, wherein a cathode of the second diode, a cathode of the fourth diode, a cathode of the sixth diode, a cathode of the eighth diode are coupled to the positive voltage end; a cathode of the first diode and a cathode of the fifth diode are coupled to a non-ground end of the first power switch; a cathode of the third diode and a cathode of the seventh diode are coupled to a non-ground end of the second power switch.

16. The method in claim 14, when the AC power source is in positive-half operation, the positive-half control switch is turned on, the negative-half control switch is turned off, the first power switch and the second power switch are switched between turning on and turning off; when the AC power source is in negative-half operation, the positive-half control switch is turned off, the negative-half control switch is turned on, the first power switch and the second power switch are switched between turning on and turning off.

17. The method in claim 16, when the positive-half control switch is turned on and the first power switch is turned on, the first diode is turned on and the first inductor is in energy-storage operation; when the positive-half control switch is turned on and the second power switch is turned on, the third diode is turned on and the second inductor is in energy-storage operation; and when the negative-half control switch is turned on and the first power switch is turned on, the fifth diode is turned on and the third inductor is in energy-storage operation; and when the negative-half control switch is turned on and the second power switch is turned on, the seventh diode is turned on and the fourth inductor is in energy-storage operation.

18. The method in claim 16, wherein when the positive-half control switch is turned on and the first power switch is turned off, the second diode is turned on and the first inductor is in energy-release operation; when the positive-half control switch is turned on and the second power switch is turned off, the fourth diode is turned on and the second inductor is in energy-release operation; and when the negative-half control switch is turned on and the first power switch is turned off, the sixth diode is turned on and the third inductor is in energy-release operation; when the negative-half control switch is turned on and the second power switch is turned off, the eighth diode is turned on and the fourth inductor is in energy-release operation.

19. The method in claim 17, wherein when the first inductor is in energy-storage operation, the line end, the first inductor, the first diode, the first power switch, the ground end, the positive-half control switch and the neutral end form a first energy-storage path;

when the second inductor is in energy-storage operation, the line end, the second inductor, the third diode, the second power switch, the ground end, the positive-half control switch and the neutral end form a second energy-storage path;

when the third inductor is in energy-storage operation, the neutral end, the third inductor, the fifth diode, the first power switch, the ground end, the negative-half control switch and the line end form a third energy-storage path; and when the fourth inductor is in energy-storage operation, the neutral end, the fourth inductor, the seventh diode, the second power switch, the ground end, the negative-half control switch and the line end form a fourth energy-storage path.

20. The method in claim 18, wherein when the first inductor is in energy-release operation, the first inductor, the second diode, the output capacitance, the ground end, the positive-half control switch, the neutral end, and the line end form a first energy-release path;

when the second inductor is in energy-release operation, the second inductor, the fourth diode, the output capacitance, the ground end, the positive-half control switch, the neutral end, and the line end form a second energy-release path;

when the third inductor is in energy-release operation, the third inductor, the sixth diode, the output capacitance, the ground end, the negative-half control switch, the line end, and the neutral end form a third energy-release path; and when the fourth inductor is in energy-release operation, the fourth inductor, the eighth diode, the output capacitance, the ground end, the negative-half control switch, the line end, and the neutral end form a fourth energy-release path.

* * * * *